US012804670B2

(12) United States Patent
Sun et al.

(10) Patent No.: US 12,804,670 B2
(45) Date of Patent: Nov. 17, 2026

(54) PDCCH RELIABILITY ENHANCEMENT FOR MULTI-TRP OPERATION

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Weidong Yang, San Diego, CA (US); Oghenekome Oteri, San Diego, CA (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 638 days.

(21) Appl. No.: 17/438,355

(22) PCT Filed: Aug. 5, 2021

(86) PCT No.: PCT/CN2021/111042
§ 371 (c)(1),
(2) Date: Sep. 10, 2021

(87) PCT Pub. No.: WO2023/010477
PCT Pub. Date: Feb. 9, 2023

(65) Prior Publication Data
US 2024/0064760 A1 Feb. 22, 2024

(51) Int. Cl.
*H04W 72/231* (2023.01)
*H04W 72/1273* (2023.01)

(52) U.S. Cl.
CPC ..... *H04W 72/231* (2023.01); *H04W 72/1273* (2013.01)

(58) Field of Classification Search
CPC ........... H04W 72/231; H04W 72/1273; H04W 72/23; H04W 72/00; H04W 72/046;
(Continued)

(56) References Cited

U.S. PATENT DOCUMENTS 11,838,935 B2 * 12/2023 Kuang ................ H04L 27/0006
11,924,848 B2 * 3/2024 Saber ........................ H04L 1/08
(Continued)

FOREIGN PATENT DOCUMENTS

CN 111699654 A 9/2020
KR 20210018050 A * 2/2021 ........... H04W 16/14
(Continued)

OTHER PUBLICATIONS

Enhancements on Multi-TRP for PDCCH, PUCCH and PUCCH, Qualcomm Incorporated, 3GPP TSG-RAN WG1 Meeting #104-bis-e, R1-2103151, 3rd Generation Partnership Project (3GPP), XP052177951, Apr. 12-20, 2021, 33 pages.
(Continued)

*Primary Examiner* — Shean Tokuta
(74) *Attorney, Agent, or Firm* — Kilpatrick Townsend & Stockton LLP

(57) ABSTRACT

Provided is a method for a user equipment (UE). The UE obtains a first control information from a network device. The first control information indicates a plurality of search space sets including a first search space set and a second search space set. The first search space set and the second search space set are linked. The first search space set includes a first physical downlink control channel (PDCCH) candidate for the first search space set and the second search space set includes a first PDCCH candidate for the second search space set. The first PDCCH candidate for the first search space set and the first PDCCH candidate for the second search space set are linked. The UE monitors PDCCH candidates based on the first control information.

21 Claims, 12 Drawing Sheets

(58) Field of Classification Search
CPC ... H04L 5/0053; H04L 35/005; H04L 1/0038; H04B 7/0413
See application file for complete search history.

(56) References Cited

U.S. PATENT DOCUMENTS

| | | | | |
|---|---|---|---|---|
| 2019/0190582 | A1* | 6/2019 | Guo | H04B 17/17 |
| 2019/0223164 | A1* | 7/2019 | He | H04W 76/27 |
| 2019/0313321 | A1 | 10/2019 | Xu et al. | |
| 2020/0221485 | A1* | 7/2020 | Cirik | H04L 5/0048 |
| 2020/0337029 | A1* | 10/2020 | Yi | H04W 72/23 |
| 2020/0351682 | A1* | 11/2020 | Cirik | H04B 7/06968 |
| 2021/0153177 | A1* | 5/2021 | Hosseini | H04W 72/23 |
| 2021/0160828 | A1* | 5/2021 | Taherzadeh Boroujeni | H04L 5/0053 |
| 2021/0195600 | A1 | 6/2021 | Khoshnevisan et al. | |
| 2021/0195601 | A1* | 6/2021 | Khoshnevisan | H04L 1/08 |
| 2021/0234640 | A1* | 7/2021 | Cirik | H04L 1/1819 |
| 2021/0314993 | A1* | 10/2021 | Takeda | H04L 5/0053 |
| 2021/0360667 | A1* | 11/2021 | Moon | H04L 5/0035 |
| 2022/0039072 | A1* | 2/2022 | Babaei | H04L 5/0053 |
| 2022/0053522 | A1* | 2/2022 | MolavianJazi | H04L 1/1819 |
| 2022/0095343 | A1* | 3/2022 | Khoshnevisan | H04L 1/08 |
| 2022/0095357 | A1* | 3/2022 | Khoshnevisan | H04W 72/23 |
| 2022/0209904 | A1* | 6/2022 | Jang | H04L 27/26025 |
| 2022/0217694 | A1* | 7/2022 | Kim | H04L 1/1864 |
| 2022/0225301 | A1* | 7/2022 | Khoshnevisan | H04L 5/0094 |
| 2022/0303959 | A1* | 9/2022 | Khoshnevisan | H04L 1/0046 |
| 2022/0304015 | A1* | 9/2022 | Yi | H04L 27/26025 |
| 2022/0304026 | A1* | 9/2022 | MolavianJazi | H04L 1/0061 |
| 2022/0312380 | A1* | 9/2022 | Chen | H04L 5/0053 |
| 2022/0312381 | A1* | 9/2022 | Chen | H04L 5/0048 |
| 2022/0321285 | A1* | 10/2022 | Khoshnevisan | H04L 5/0003 |
| 2022/0361219 | A1* | 11/2022 | Khoshnevisan | H04L 5/0053 |
| 2022/0361221 | A1* | 11/2022 | Khoshnevisan | H04L 1/0067 |
| 2022/0408458 | A1* | 12/2022 | MolavianJazi | H04L 5/001 |
| 2023/0033461 | A1* | 2/2023 | Khoshnevisan | H04L 5/001 |
| 2023/0039536 | A1* | 2/2023 | Liu | H04L 5/0053 |
| 2023/0156665 | A1* | 5/2023 | Gao | H04L 5/0091 370/329 |
| 2023/0336232 | A1* | 10/2023 | Moon | H04B 7/0695 |
| 2023/0344580 | A1* | 10/2023 | Sohrabi | H04L 5/0048 |
| 2023/0397228 | A1* | 12/2023 | Shi | H04L 5/0053 |
| 2024/0040584 | A1* | 2/2024 | Yuan | H04B 7/0696 |
| 2024/0064760 | A1* | 2/2024 | Sun | H04L 5/0023 |
| 2024/0430904 | A1* | 12/2024 | Zhang | H04W 72/231 |

FOREIGN PATENT DOCUMENTS

| | | | | | |
|---|---|---|---|---|---|
| KR | 20230022145 | A * | 2/2023 | H04L 1/0038 |
| KR | 20230157291 | A * | 11/2023 | H04L 5/001 |
| KR | 20240036017 | A * | 3/2024 | H04W 72/23 |
| WO | WO-2019139955 | A1 * | 7/2019 | H04W 72/23 |
| WO | WO-2020145368 | A1 * | 7/2020 | H04W 72/23 |
| WO | WO-2020145595 | A1 * | 7/2020 | H04W 72/04 |
| WO | WO-2020206086 | A1 * | 10/2020 | H04W 72/0446 |
| WO | WO-2020217512 | A1 * | 10/2020 | H04L 5/0044 |
| WO | 2020249844 | A1 | 12/2020 | |
| WO | WO-2021091179 | A1 * | 5/2021 | H04W 72/23 |
| WO | WO-2021161266 | A1 * | 8/2021 | H04L 5/0053 |
| WO | WO-2021206446 | A1 * | 10/2021 | H04L 1/06 |
| WO | WO-2022046717 | A1 * | 3/2022 | H04W 72/21 |
| WO | WO-2022154582 | A1 * | 7/2022 | H04W 72/51 |
| WO | WO-2023010477 | A1 * | 2/2023 | H04L 1/0038 |

OTHER PUBLICATIONS

Enhancements on Multi-TRP for PDCCH, PUCCH and PUSCH, Qualcomm Incorporated, 3GPP TSG-RAN WG1 Meeting #104-e, R1-2101447, 3rd Generation Partnership Project (3GPP), XP051971612, Jan. 25-Feb. 5, 2021, 28 pages.
On Multi-TRP Enhancements for PDCCH and PUSCH, Fraunhofer IIS, Fraunhofer HHI, 3GPP TSG RAN WG1 Meeting #104-bis-e, R1-2102807, 3rd Generation Partnership Project (3GPP), XP051993208, Apr. 12-20, 2021, 9 pages.
On PDCCH, PUCCH and PUSCH Enhancements for Multi-TRP, Ericsson, 3GPP TSG-RAN WG1 Meeting #104bis-e, R1-2103550, 3rd Generation Partnership Project (3GPP), XP052178262, Apr. 12-20, 2021, 30 pages.
European Patent Application No. 21916646.9, Extended European Search Report, Dec. 5, 2022, 11 pages.
New WID: Further enhancements on MIMO for NR, Samsung, 3GPP TSG RAN Meeting #86, RP-193133, Dec. 9-12, 2019, 5 pages.
3rd Generation Partnership Project; Technical Specification Group Radio Access Network; NR; Physical layer procedures for data (Release 16), 3GPP TS 38.214 V16.6.0, Jun. 2021, 173 pages.
3rd Generation Partnership Project; Technical Specification Group Radio Access Network; NR; Medium Access Control (MAC) protocol specification (Release 16), 3GPP TS 38.321 V16.5.0, Jun. 2021, 157 pages.
3rd Generation Partnership Project; Technical Specification Group Radio Access Network; NR; Radio Resource Control (RRC) protocol specification (Release 16), 3GPP TS 38.331 V16.5.0, Jun. 2021, 959 pages.
Remaining issues on PDCCH search space, vivo, 3GPP TSG RAN WG1 Meeting #92bis, R1-1803828, Apr. 20, 2018, 6 pages.
International Patent Application No. PCT/CN2021/111042, International Search Report and Written Opinion, Mailed on May 9, 2022, 9 pages.
3rd Generation Partnership Project; Technical Specification Group Radio Access Network; NR; Physical layer procedures for control (Release 16), 3GPP TS 38.213 V16.6.0, Jun. 2021, 187 pages.
European Patent Application No. 21916646.9, Office Action, Nov. 16, 2023, 7 pages.
Korea Patent Application No. 10-2022-7026468, Office Action, Jan. 14, 2025, 11 pages.
Enhancements on Multi-TRP for Reliability and Robustness in Rel-17, 3 Generation Partnership Project Technical Specification Group-Radio Access Network Working Group 1 Meeting #104bis-e, R1-2102334, Apr. 12-20, 2021, 15 pages.
China Patent Application No. 202180009248.2, Office Action, Jun. 20, 2025, 12 pages.
Korea Patent Application No. 10-2022-7026468, Office Action, Aug. 6, 2025, 11 pages.
Maintenance for Downlink Signals and Channels, 3Generation Partnership Project Technical Specification Group Radio Access Network Working Group1 Meeting #94bis, R1-1811356, Oct. 8-12, 2018, 9 pages.
European Patent Application No. 21916646.9, Office Action, Sep. 26, 2025, 9 pages.

* cited by examiner

PDCCH RELIABILITY ENHANCEMENT FOR MULTI-TRP OPERATION

CROSS-REFERENCES TO RELATED APPLICATIONS

This application is a U.S. National Stage Application of PCT/CN2021/111042, filed Aug. 5, 2021. The disclosure of which is herein incorporated by reference in its entirety for all purposes.

TECHNICAL FIELD

This application relates generally to wireless communication systems, and more specifically to physical downlink control channel (PDCCH) reliability enhancement for multi-TRP (multiple transmission and reception point) operation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes: obtaining a first control information from a network device, wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and monitoring PDCCH candidates based on the first control information.

According to an aspect of the present disclosure, a method for a network device is provided that includes: generating a first control information for transmission to a user equipment (UE), wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and generating PDCCH candidates based on the first control information for transmission to the UE.

According to an aspect of the present disclosure, an apparatus for a user equipment (UE) is provided that includes one or more processors configured to perform steps of the method according to the present disclosure.

According to an aspect of the present disclosure, an apparatus of a network device is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means for performing steps of the method according to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, a physical downlink control channel (PDCCH) is used to transmit control information. When determining a PDCCH for a UE, the base station may transmit a plurality of PDCCH candidates. One or more PDCCH candidates of the plurality of PDCCH candidates may be used for this UE as PDCCH(s) according to downlink control information (DCI) that may be contained in the one or more PDCCH candidates.

In related technologies, the duration of PDCCH may occupy 1 symbol, 2 symbols or 3 symbols. In other words, the maximum duration of PDCCH is only 3 symbols. Thus, the PDCCH reliability is limited, especially for the situation involving multiple transmission and reception points (multi-TRPs) operation.

Figure 1:
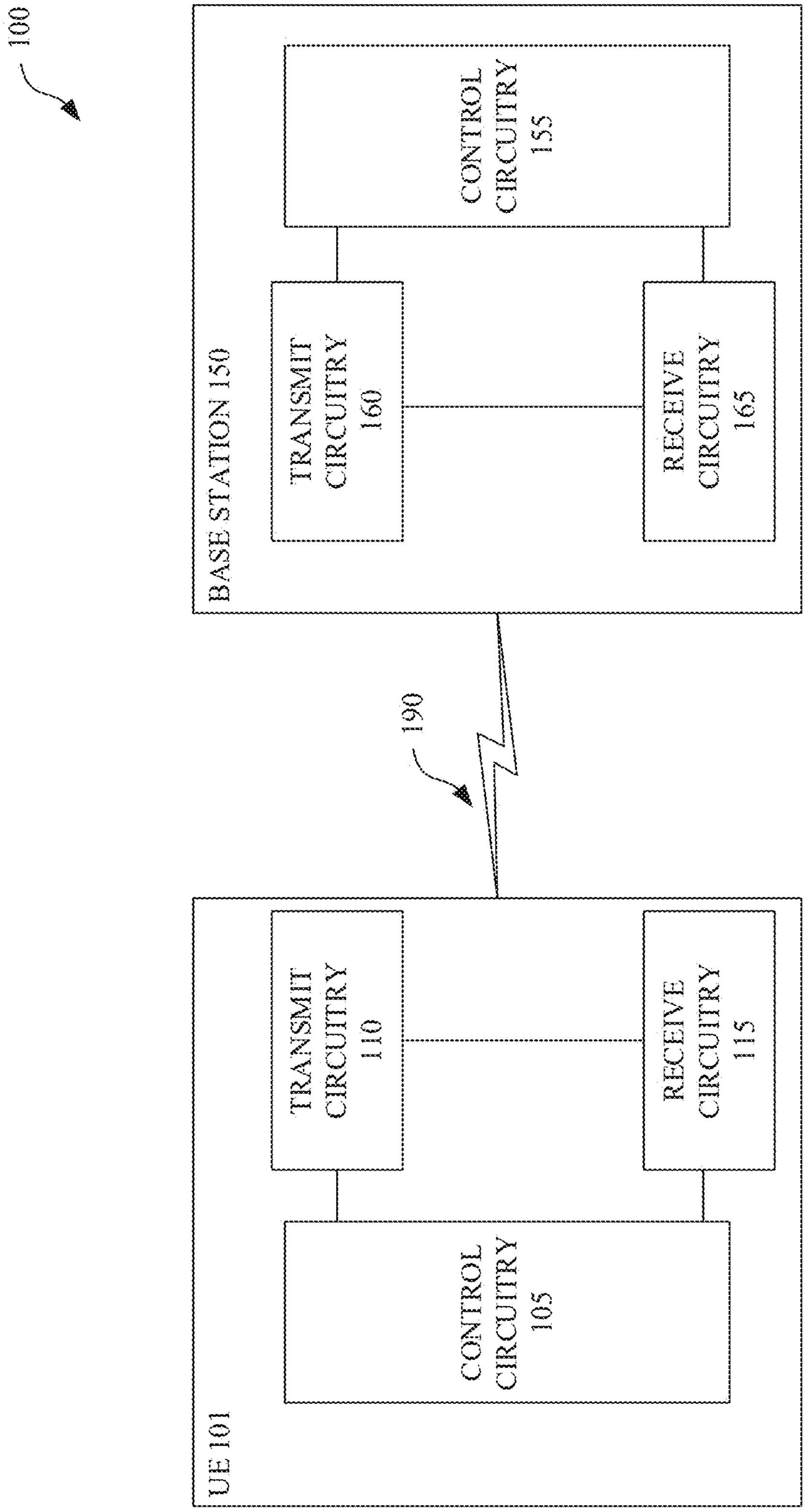
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the network device described in the following embodiments may be implemented by the UE 101 and the base station 150 described in FIG. 1.

Figure 2:
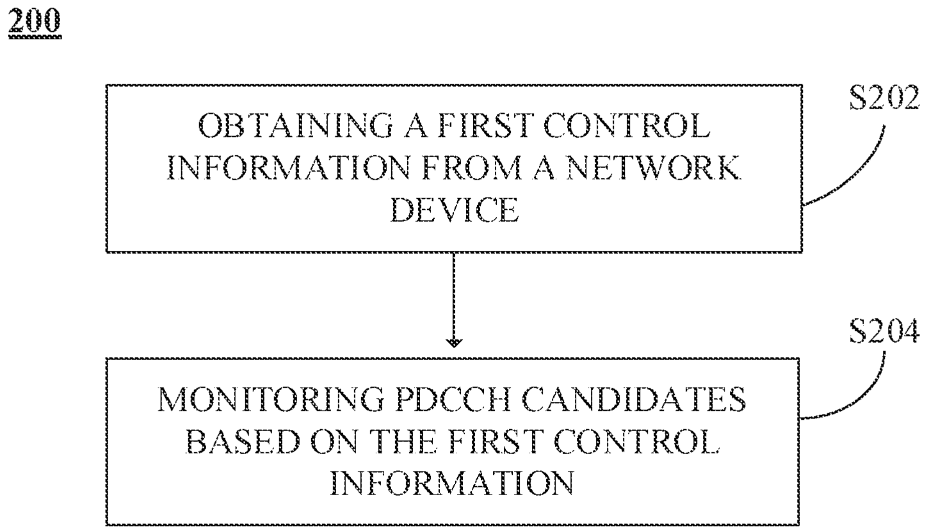
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include the following steps: S202, obtaining a first control information from a network device, wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and S204, monitoring PDCCH candidates based on the first control information.

According to some embodiments of the present disclosure, by receiving the first control information that indicates the linkage between the first search space set and the second search space set and the linkage between the first PDCCH candidate for the first search space set and the first PDCCH candidate for the second search space from the network device, the repetition of PDCCH for the UE is allowed due to the above linkages and thus the maximum duration of PDCCH is increased. That is, the number of symbols used for PDCCH is increased, which means the time and the energy accumulated for transmitting PDCCH are increased, thereby enhancing the PDCCH reliability for multi-TRP operation.

In the following, each step of the method 200 will be described in details.

At step S202, the UE obtains a first control information from a network device, wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked.

According to some embodiments of the present disclosure, the first control information may be a radio resource control (RRC) signal, but the present disclosure does not limit to this. It should be noted that the first control information may also be any other kinds of control information.

According to some embodiments of the present disclosure, a search space set is used for configuring the time domain pattern of the monitoring of PDCCH candidate.

In some embodiments, the time domain pattern of the monitoring of PDCCH candidate may include the period of PDCCH candidate that is transmitted from the network device to the UE. For example, the first control information may configure that the PDCCH candidates is transmitted every 20 slots, every 10 slots, every 5 slots, every 1 slot or any suitable period of transmitting PDCCH candidates.

In some embodiments, the time domain pattern of the monitoring of PDCCH candidate may include the position in time domain of the starting symbol of PDCCH candidate (e.g., offset). For example, search space set may configure that the PDCCH candidates are transmitted in the first symbol of the first slot, but the present disclosure does not limit to this and the PDCCH candidates may be started in any suitable position.

In related art, there is certainly no linkage for different search space sets. A search space set may include one or more PDCCH candidates, but there is no linkage between any two PDCCH candidates in this search space set.

However, according to some embodiments of the present disclosure, a plurality of search space sets are configured. In other words, two or more search space sets are configured by the network device. The plurality of search space sets include a first search space set and a second search space set, wherein a linkage is established between the first search space set and the second search space set. That is, according to some embodiments of the present disclosure, at least one linkage is established between two search space sets of the plurality of search space sets. In some embodiments, other linkages may be established between any two or more search space sets of the plurality of search space sets.

In some embodiments, each search space set may include one or more PDCCH candidates. For example, a search space set may include 44 PDCCH candidates, but the present disclosure does not limit to this and the search space set may include any suitable number of PDCCH candidates.

In the following, we will discuss the meaning of "linkage" between two search space sets. According to some embodiments of the present disclosure, if at least one PDCCH candidate of the first search space set is linked to at least one PDCCH candidate of the second search space set, the first search space set is considered to be linked to the second search space set.

It should be noted that the "linkage" between two PDCCH candidates means that the payload of one PDCCH candidate of the two PDCCH candidates is the same as that of the other PDCCH candidate of the two PDCCH candidates. That is, the linked two PDCCH candidates in two different search space sets include the same payload (e.g., same control information). The differences between the linked two PDCCH candidates may include that they are transmitted to the UE in different time instant and they may be transmitted by different beams.

According to some embodiments of the present disclosure, a linkage is established between a first PDCCH candidate for the first search space set and a first PDCCH candidate for the second search space set. It should be noted that, the first PDCCH candidate for the first search space set can be any PDCCH candidate in the first search space set and the first PDCCH candidate for the second search space set can be any PDCCH candidate in the second search space set as long as there is a linkage between the first PDCCH candidate for the first search space set and the first PDCCH candidate for the second search space set In other words, the first PDCCH candidate for the first search space set and the first PDCCH candidate for the second search space set have the same payload, but the first PDCCH candidate for the first search space set and the first PDCCH candidate for the second search space set are transmitted to UE in different time instant and/or by different beams.

However, it should be noted that, according to the present disclosure, the "linkages" can be established among more than two PDCCH candidates. In some embodiments, the first PDCCH candidates for the first search space set may be linked to the first PDCCH candidates for the second search space set and the first PDCCH candidates for another search space set of the plurality of search space set at the same time. In some embodiments, the first PDCCH candidates for the first search space set may be linked to the first PDCCH candidate and another PDCCH candidate for the second search space set. The present disclosure does not limit to the above listed embodiments.

According to the present disclosure, there may be some restrictions for the linkages of two or more PDCCH candidates for corresponding search space sets.

According to some embodiments, the first search space set includes a first plurality of PDCCH candidates for the first search space set and the second search space set includes a second plurality of PDCCH candidates for the second search space set, and each PDCCH candidate of the first plurality of PDCCH candidates for the first search space set is linked to at least one PDCCH candidate of the second plurality of PDCCH candidates for the second search space set.

In the present disclosure, "first plurality" does not necessarily mean to be different from "second plurality". According to some embodiments, the number of PDCCH candidates of the first plurality of PDCCH candidates for the first search space set may be the same as the number of PDCCH candidates of the second plurality of PDCCH candidates for the second search space set. According to some embodiments, the number of PDCCH candidates of the first plurality of PDCCH candidates for the first search space set may be different from the number of PDCCH candidates of the second plurality of PDCCH candidates for the second search space set.

According to some embodiments, for the two linked search space sets, every PDCCH candidate in one search space set has to be linked to another PDCCH candidate in the linked search space set, and it is allowed that one PDCCH candidate in one search space set is linked to more than one PDCCH candidates in the linked search space set.

According to some embodiments of the present disclosure, each PDCCH candidate in one search space set has at least one linkage with other PDCCH candidates, such that each PDCCH candidate can be repeated. That is, the maximum duration of PDCCH and the symbols used for PDCCH is further increased, which means the time and the energy accumulated for transmitting PDCCH are further increased, thereby further enhancing the PDCCH reliability for multi-TRP operation.

According to some embodiments, each PDCCH candidate of the first plurality of PDCCH candidates for the first search space set is one-to-one linked to each PDCCH candidate of the second plurality of PDCCH candidates for the second search space set.

According to some embodiments, for the two linked search space set, every PDCCH candidate in one search space set has to be linked to another PDCCH candidate in the linked search space set, and it is not allowed that one PDCCH candidate in one search space set is linked to more than one PDCCH candidates in the linked search space set.

According to some embodiments of the present disclosure, on one hand, each PDCCH candidate in one search space set has one linkage with other PDCCH candidates, such that each PDCCH candidate can be repeated, thereby enhancing the PDCCH reliability for multi-TRP operation as discussed above. On the other hand, the one-to-one linkage of the PDCCH candidates in one search space set and the linked PDCCH candidates in the linked search space set simplifies the linkages, thereby reducing the complexity of decoding (e.g., blind decoding) these PDCCH candidates.

According to some embodiments, the first search space set includes a first plurality of PDCCH candidates for the first search space set, and one or more PDCCH candidates of the first plurality of PDCCH candidates for the first search space set are not linked to any PDCCH candidate in the second search space set.

According to some embodiments, for the two linked search space set, not every PDCCH candidate in one search space set has to be linked to another PDCCH candidate in the linked search space set. Instead, one or more PDCCH candidates in one search space set is linked to other PDCCH candidates in the linked search space set, but another one or more PDCCH candidates in one search space set is not linked to any PDCCH candidate in the linked search space set.

According to the present disclosure, there may be some restrictions for the linkages of two or more search space sets in the plurality of search space sets and there may be some restrictions for the linkages of two or more PDCCH candidates for corresponding search space sets.

According to some embodiments, the first search space set is only linked to the second search space set.

In some embodiments, one search space set is linked to only one other search space set and it is not allowed that one search space set is linked to more than one search space sets.

According to some embodiments of the present disclosure, one search space set links to only one linked search space set, which simplifies the linkages, thereby reducing the complexity of decoding (e.g., blind decoding) these PDCCH candidates.

According to some embodiments, the first search space set is linked to the second search space set and one or more search space sets that are different from the first search space set and the second search space set of the plurality of search space sets.

In some embodiments, it is allowed that one search space set is linked to more than one search space sets. For example, the first control information indicates search space set 1, search space set 2, search space set 3, etc., wherein search space set may be linked to both search space set 2 and search space set 3.

According to some embodiments of the present disclosure, one search space set links to more than one linked search space sets, which extends the linkages and further increase the repetition of PDCCH candidates, thereby further enhancing the PDCCH reliability for multi-TRP operation.

According to some embodiments, the first search space set includes in time domain a first plurality of search spaces that are periodically repeated in a first period and the second search space set includes in time domain a second plurality of search spaces that are periodically repeated in a second period, and the first period is same as the second period.

As discussed above, in the present disclosure, "first plurality" does not necessarily mean to be different from "second plurality". According to some embodiments, the number of search spaces of the first plurality of search spaces may be the same as the number of search spaces of the second plurality of search spaces. According to some embodiments, the number of search spaces of the first plurality of search spaces may be different from the number of search spaces of the second plurality of search spaces.

According to some embodiments, search space set may include a plurality of search spaces, and these search spaces may be periodically transmitted by the network device and received by the UE. In some embodiments, one search space set may have the same periodicity as the linked search space set, which means the search spaces in one search space set and the search spaces in the linked search space set are transmitted by the network device and received by the UE in the same period.

Figure 3A:
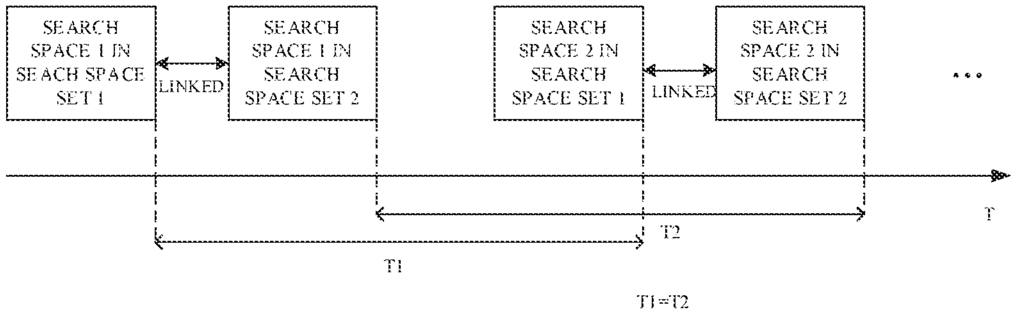
FIG. 3A illustrate an exemplary diagram for exemplary search spaces in the first search space set and search spaces in the second search space set with the same period in accordance with some embodiments.

FIG. 3A illustrate an exemplary diagram for exemplary search spaces in the first search space set and search spaces in the second search space set with the same period in accordance with some embodiments.

In FIG. 3A, a first search space of the first search space set (search space 1 in search space set 1) and a second search space of the first search space set (search space 2 in search space set 1) are shown. It can be seen from FIG. 3A, the period of search spaces of the first search space set is T1. Although other search spaces of the first search space set are not explicitly shown in FIG. 3A, it can be understood that the search spaces of the first search space set are repeated every period of T1. In addition, a first search space of the second search space set (search space 1 in search space set 2), a second search space of the second search space set (search space 2 in search space set 2) are shown. It can be seen from FIG. 3A, the period of search spaces of the second search space set is T2. Although other search spaces of the second search space set are not explicitly shown in FIG. 3A, it can be understood that the search spaces of the second search space set are repeated every period of T2. As an example, these two periods T1 and T2 are the same, i.e., T1=T2. For example, T1=T2=20 slots.

As for linkage, it can be seen that search space 1 in search space set 1 is linked to search space 1 in search space set 2 and search space 2 in search space set 1 is linked to search space 2 in search space set 2. In addition, it can be deduced that search space X of search space set 1 is linked to search space X of search space set 2, where X is a positive integer number.

According to some embodiments of the present disclosure, the same period for both the search spaces in the first search space set and the search spaces in the second search space set simplifies the configuration of linkage between search spaces in time domain, thereby further reducing the complexity.

According to some embodiments, a linkage between a first search space of the first search space set and a first search space of the second search space set in time domain is configured by the network device.

In some embodiments, the network device explicitly configures the linkage between the search space and the linked search space. In this case, the network device configures which search space of the first search space set is linked to which search space of the second search space set. In some examples, the network device may use a RRC signaling to configure the linkage between the search spaces, but the present disclosure does not limit to this, and the network device may use any suitable signaling to configure such a linkage.

According to some embodiments of the present disclosure, the network device explicitly configures how the search spaces is linked in time domain, such that the UE may directly know the linkage in time domain without further calculations.

According to some embodiments, the linkage between the search space and the linked search space is not explicitly configured by the network device but is implicitly configured.

According to some embodiments, a linkage between a first search space of the first search space set and a first search space of the second search space set in time domain is determined according to proximity to an absolute timing.

In some embodiments, when the absolution timing is given, the search space of the first search space set that is nearest to the absolution timing among the first plurality of search spaces is linked to the search space of the second search space set that is nearest to the absolution timing among the second plurality of search spaces. In this case, a first linkage is established. Then, since both the first search space set and the second search space set are periodically repeated in the same period, the remaining first search spaces may be linked to the remaining second search spaces one by one.

According to some embodiments, the absolute timing may be a fixed timing in a system (e.g., a system for the UE and the network device). In some embodiments, the absolute timing may include a system frame number. In some embodiments, the absolute timing may be the first slot in SFN 0 (System Frame Number). However, the present disclosure does not limit to this, and the absolute timing may be any suitable time fixed in the system.

According to some embodiments of the present disclosure, by setting an absolute timing as a standard to implicitly configures the linkage of search space in time domain, the network device does not need to pair search spaces in time domain, thereby reducing the burden of network device.

According to some embodiments, one search space set may have different periodicity from the linked search space set, which means the search spaces in one search space set and the search spaces in the linked search space set are transmitted by the network device and received by the UE in different periods.

According to some embodiments, the first search space set includes in time domain a first plurality of search spaces that are periodically repeated in a first period and the second search space set includes in time domain a second plurality of search spaces that are periodically repeated in a second period, and the first period is shorter than the second period.

According to some embodiments, the second period may be N times longer as the first period, where N>1 (e.g., 2, 3, 4, 5, etc.).

Figure 3B:
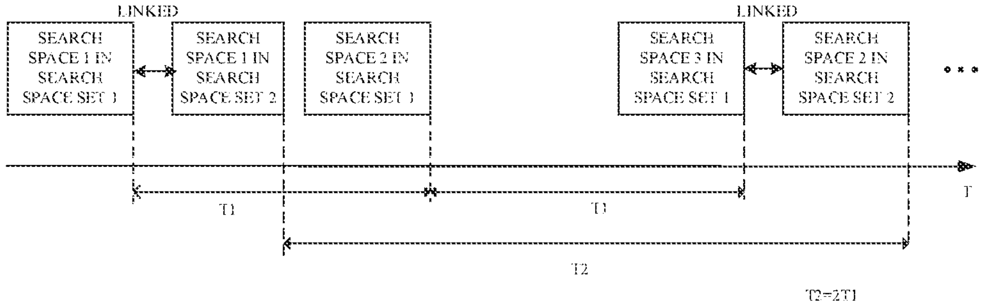
FIG. 3B illustrate an exemplary diagram for exemplary search spaces in the first search space set and search spaces in the second search space set with different periods in accordance with some embodiments.

FIG. 3B illustrate an exemplary diagram for exemplary search spaces in the first search space set and search spaces in the second search space set with different periods in accordance with some embodiments.

In FIG. 3B, a first search space of the first search space set (search space 1 in search space set 1), a second search space of the first search space set (search space 2 in search space set 1), a third search space of the first search space set (search space 3 in search space set 1), Although other search spaces of the first search space set are not explicitly shown in FIG. 3B, it can be understood that the search spaces of the first search space set are repeated every period of T1. In addition, a first search space of the second search space set (search space 1 in search space set 2), a second search space of the second search space set (search space 2 in search space set 2) are shown. It can be seen from FIG. 3A, the period of search spaces of the second search space set is T2.

Although other search spaces of the second search space set are not explicitly shown in FIG. 3B, it can be understood that the search spaces of the second search space set are repeated every period of T1. These two periods are different. Specifically, as shown in FIG. 3B, 2T1=T2. For example, T1 may be 10 slots, and T2 may be 20 slots.

As for linkage, it can be seen that search space 1 in search space set 1 is linked to search space 1 in search space set 2 and search space 3 in search space set 1 is linked to search space 2 in search space set 2, while search space 2 in search space set 1 does not link to any search space of search space set 2. In addition, it can be deduced that search space Y of search space set 1 is linked to search space (Y+1)/2 of search space set 2, while search space Y+1 of search space set 1 does not link to any search space of search space set 2, where Y is a positive odd number.

According to some embodiments, the first period may be longer than the second period. For example, N may be less than 1 but more than 0 (e.g., ½, ⅓, ¼, ⅕, etc.). However, the present disclosure does not limit to this, N may be any suitable positive real number.

Hereinafter, for convenience of explanation, assuming that the first period is shorter than the second period.

According to some embodiments, a search space of the first search space set is not linked to any search space of the second search space set, and monitoring PDCCH candidates based on the first control information further includes not monitoring PDCCH candidates in the search space of the first search space set that is not linked to any search space of the second search space set.

According to some embodiments, since the first period is shorter than the second period, there may be one or more search spaces in the first search space that are not linked to any search space of the second search space set. For example, according to the example shown in FIG. 3B, search space Y+1 of search space set 1 does not link to any search space of search space set 2, where Y is a positive odd number.

According to some embodiments, in this case, the UE may not monitor PDCCH candidates in the search space of the first search space set that is not linked to any search space of the second search space set.

According to some embodiments of the present disclosure, with the above configuration, even if the period for the search spaces in one search space set is different from that for the search spaces in the linked search space set, the linkage of search spaces in time domain can still be established. In addition, UE can only monitor the search spaces that have linkage, thereby saving energy.

According to some embodiments, a search space of the first search space set is not linked to any search space of the second search space set, and monitoring PDCCH candidates based on the first control information further include monitoring PDCCH candidates in the search space of the first search space set that is not linked to any search space of the second search space set.

According to some embodiments, the UE may still monitor PDCCH candidates in the search space of the first search space set that is not linked to any search space of the second search space set. In some embodiments, during the monitoring, the counting of the number of blind decoding (BD) may be reduced. In other embodiments, during the monitoring, the counting of the number of blind decoding (BD) may be unchanged. The definition of the counting of the number of BD will be discussed later along with step S204.

According to some embodiments of the present disclosure, with the above configuration, even if the period for the search spaces in one search space set is different from that for the search spaces in the linked search space set, the linkage of search spaces in time domain can still be established. In addition, UE can monitor both the search spaces that have linkage and the search spaces that do not have any linkage, thereby fulfilling a more comprehensive monitoring of search spaces in time domain.

At step S204, the UE monitors PDCCH candidates based on the first control information.

After receiving the first control information that indicates the linkage between search space sets and the linkage between the PDCCH candidates, the UE generally knows the time domain pattern of PDCCH candidate transmitted by the network device. Then, the network device may continue to transmit multiple PDCCH candidates. The UE monitors these PDCCH candidates to find if there is one or more PDCCH candidates are used for the UE according to the first control information.

According to the present disclosure, during wireless transmission, it is possible that PDCCH candidate collides with other signals.

In some embodiments, PDCCH may collide with a synchronization signal (e.g., SSB) which has a higher priority than PDCCH candidate. In some embodiment, PDCCH may collide with uplink (UL) symbols which has a higher priority than PDCCH candidate. In some embodiment, PDCCH may collide with configured LTE cell reference signal (CRS) which has a higher priority than PDCCH candidate. In some embodiment, PDCCH may collide with semi-statically configured rate matching resources for PDSCH which has a higher priority than PDCCH candidate. However, the present disclosure does not limit to this, PDCCH candidate may collide with any signal with higher priority than it.

In the following, we will discuss the dropping of PDCCH candidate and its linked PDCCH candidate when the abovementioned collisions happen and whether to monitor the PDCCH candidate and/or it linked PDCCH candidate.

According to some embodiments, if one PDCCH candidate in the first search space set collides with other high priority signals and the linked PDCCH candidate in the second search space set does not collide with other high priority signals, one PDCCH candidate and its linked PDCCH candidate can be both dropped. In some embodiments, the UE may still monitor both one PDCCH candidate and its linked PDCCH candidate. In some embodiments, the UE may not monitor one PDCCH candidate and its linked PDCCH candidate. In some embodiments, the UE may monitor either one of one PDCCH candidate and its linked PDCCH candidate.

According to some embodiments, the first PDCCH candidate for the first search space set is dropped, and monitoring PDCCH candidates based on the first control information further includes: monitoring the first PDCCH candidate for the second search space set, without monitoring the first PDCCH candidate for the first search space set that is linked to the first PDCCH candidate for the second search space set.

According to some embodiments, if one PDCCH candidate is dropped but the linked PDCCH candidate is not dropped, the UE may monitor the linked PDCCH candidate that is not dropped but not monitor the PDCCH candidate that is dropped.

According to some embodiments of the present disclosure, compared with monitoring both one PDCCH candidate and its linked PDCCH candidate, by monitoring the not dropped (linked) PDCCH candidate but not monitoring the dropped PDCCH, the UE can reduce the monitoring and save energy. On the other hand, by still monitoring the linked PDCCH candidate, the possibility of skipping the target PDCCH candidate is reduced, thereby further enhancing the PDCCH reliability.

According to some embodiments, the first PDCCH candidate for the first search space set is dropped, and monitoring PDCCH candidates based on the first control information further includes: neither monitoring the first PDCCH candidate for the first search space set, nor monitoring the first PDCCH candidate for the second search space set that is linked to the first PDCCH candidate for the second search space set.

According to some embodiments, monitoring PDCCH candidates based on the first control information includes blind decoding (BD) PDCCH candidates based on the first control information.

According to some embodiments, when receiving multiple PDCCH candidates from the network device, the UE does not know which PDCCH candidate(s) is used for itself, and the UE blind decodes each PDCCH candidate. In some embodiments, after blind decoding of PDCCH candidates, the UE may know the PDCCH candidate used for this UE and then use this decoding results of PDCCH candidate for control information.

In some embodiment, blind decoding may include the checking (e.g., cyclic redundancy check (CRC)) and polar decoding, but the present disclosure does not limit to this.

According to some embodiments, the counting of the number of blind decoding (BD) may be recorded by UE. In some embodiments, the UE may report the counting of the number of BD to the network device. It should be noted that, the counting of the number of BD does not necessarily mean the actual number of BD that is performed by the UE.

According to some embodiments, the counting of the number of BD is not equal to the actual number of BD that is performed by the UE.

According to some embodiments, monitoring PDCCH candidates based on the first control information further comprises still counting blind decoding for both the first PDCCH candidate for the first search space set and the first PDCCH candidate for the second search space set, and the number of blind decoding is counted based on a capability of the UE.

According to some embodiments, when UE does not monitor the first PDCCH candidate for the first search space set, UE still counts number of blind decoding assuming that UE performs blind decoding for both the first PDCCH candidate for the first search space set and the first PDCCH candidate for the second search space set, and the number of blind decoding is counted based on a capability of the UE.

According to some embodiments, since the UE blind decodes the first PDCCH candidate for the second search space set but does not blind decode the first PDCCH candidate for the first search space set, the UE only blind decode 1 time of blind decoding for the first PDCCH candidate for the first search space set. However, the number of blind decoding is counted based on a capability of the UE.

According to some embodiments, the capability of the UE includes whether the UE supports joint blind decoding. According to some embodiments, joint blind decoding may include blind decoding the combination of PDCCH candidate and the linked PDCCH candidate.

According to some embodiments, the capability of the UE indicates that the UE supports joint blind decoding, and the number of blind decoding is counted as 3 although the UE blind decodes the first PDCCH candidate for the second search space set and does not blind decode the first PDCCH candidate for the first search space set.

According to some embodiments, in actual operation of blind decoding, the UE receives both one PDCCH candidate and its linked PDCCH candidate, but UE blind decodes only the linked PDCCH candidate and does not blind decode the PDCCH candidate. However, since the UE supports joint blind decoding, the number of blind decoding is counted as 3, i.e., 1 time of blind decoding is counted for blind decoding the PDCCH candidate (although this blind decoding is not performed), 1 time of blind decoding is counted for blind decoding the linked PDCCH candidate, and 1 time of blind decoding is counted for blind decoding the combination of one PDCCH candidate and its linked PDCCH candidate. In some embodiments, the blind decoding of the combination of one PDCCH candidate and its linked PDCCH candidate is not performed. In other embodiments, the blind decoding of the combination of one PDCCH candidate and its linked PDCCH candidate is performed.

According to some embodiments, the capability of the UE indicates that the UE does not support joint blind decoding, and the number of blind decoding is counted as 2 although the UE blind decodes the first PDCCH candidate for the second search space set and does not blind decode the first PDCCH candidate for the first search space set.

According to some embodiments, in actual operation of blind decoding, the UE receives both one PDCCH candidate and its linked PDCCH candidate, but UE blind decodes only the linked PDCCH candidate and does not blind decode the PDCCH candidate. However, since the UE does not support joint blind decoding, the number of blind decoding is counted as 2, i.e., 1 time of blind decoding is counted for blind decoding the PDCCH candidate (although this blind decoding is not performed), and 1 time of blind decoding is counted for blind decoding the linked PDCCH candidate.

According to some embodiments of the present disclosure, no matter the actual BD operations are, the counting of the number of BD is depend on the capability of the UE (e.g., whether to support joint blind decoding), which simplifies the counting of the number of BD and thus makes it easier to determine whether there is an overbooking of PDCCH candidates.

According to some embodiments, the counting of the number of BD is equal to the actual number of BD that is performed by the UE.

According to some embodiments, monitoring the first PDCCH candidate for the second search space set without monitoring the first PDCCH candidate for the first search space set further includes blind decoding the first PDCCH candidate for the second search space set without blind decoding the first PDCCH candidate for the first search space set; and the number of blind decoding is counted as 1 for blind decoding the first PDCCH candidate for the second search space set without blind decoding the first PDCCH candidate for the first search space set.

According to some embodiments, in actual operation of blind decoding, the UE receives both one PDCCH candidate and its linked PDCCH candidate, but UE blind decodes only the linked PDCCH candidate and does not blind decode the PDCCH candidate. Meanwhile, the number of blind decoding is also counted as 1, i.e., 1 time of blind decoding is counted for blind decoding the linked PDCCH candidate.

According to some embodiments, neither monitoring the first PDCCH candidate for the first search space set nor monitoring the first PDCCH candidate for the second search space set further includes neither blind decoding the first PDCCH candidate for the first search space set nor blind decoding the first PDCCH candidate for the second search space set; and the number of blind decoding is counted as 0 for neither blind decoding the first PDCCH candidate for the first search space set nor blind decoding the first PDCCH candidate for the second search space set.

According to some embodiments, in actual operation of blind decoding, the UE receives both one PDCCH candidate and its linked PDCCH candidate, but UE does not blind decodes either the linked PDCCH candidate or the PDCCH candidate. Meanwhile, the number of blind decoding is also counted as 0, i.e., no blind decoding is counted.

According to some embodiments of the present disclosure, by counting the number of BD as the actual BD operations, the counting is more proximity to the actual situation, such that the determination of the overbooking of PDCCH candidates is more accurate.

According to some embodiments, an overbooking of PDCCH candidate is allowed as discussed above. According to some embodiments, the overbooking of PDCCH candidate means that the network device configures more counting of the number of BD (e.g., BD/CCE) for UE than UE is capable of monitoring. The counting of the number of BD is discussed above. In some embodiments, the overbooking is only allowed on the primary cell. However, the present disclosure does not limit to this, the overbooking may be allowed on one or more the secondary cells.

According to some embodiments, when the overbooking of PDCCH candidates happens, UE may drop one or more search space sets from the plurality of search space sets.

According to some embodiments, detecting an overbooking of PDCCH candidates based on the first control information; and in response to detecting the overbooking of PDCCH candidates, dropping one or more search space sets of the plurality of search space sets.

According to some embodiments, the first control information may indicate the number of BD to be performed by the UE. According to some embodiments, the UE may compare the number of BD to be performed by the UE that is configured by the network device and its capability of monitoring PDCCH candidates. In some embodiments, if the UE determines that the number of BD to be performed by the UE that is configured by the network device exceeds its capability of monitoring PDCCH candidates, the UE detects the overbooking of PDCCH candidates. In some embodiments, if the UE determines that the number of BD to be performed by the UE that is configured by the network device does not exceed its capability of monitoring PDCCH candidates, the UE does not detect the overbooking of PDCCH candidates.

According to some embodiments, when detecting the overbooking of PDCCH candidates, the UE may drop one or more search space sets of the plurality of search space sets, for example, until the counting of the number of BD for the remaining search space sets does not exceed the UE's capability of monitoring PDCCH candidates.

According to some embodiments of the present disclosure, when detecting the overbooking of PDCCH candidates, by dropping one or more search space sets, the UE is able to monitor the remaining search space sets.

According to some embodiments, UE may drop one or more search space sets according to a predetermined order.

According to some embodiments, dropping one or more search space sets further includes: dropping one or more search space sets based on a linkage between search space sets.

According to some embodiments, the order of dropping search space sets determined based on whether there is a linkage between search space sets.

According to some embodiments, the plurality of search space sets further include a third search space set, wherein the third search space set is not linked to any search space set of the plurality of search space sets, and dropping one or more search space sets based on a linkage between search space sets further includes dropping the third search space set in priority.

According to some embodiments, when determining the dropping of search space sets, the search space set that does not have any linkage with one or more other search space sets is dropped in priority than the search space set that has at least one linkage with one or more other search space sets.

According to some embodiments of the present disclosure, by giving the search space set that has at least one linkage with one or more other search space sets a higher priority to be reserved, the search space sets that have linkages remain as much as possible, which relatively increases the repetition of PDCCH candidates, thereby relatively enhancing the PDCCH reliability of multi-TRP operation.

According to some embodiments, the plurality of search space sets further include a third search space set, wherein the third search space set is not linked to any search space set of the plurality of search space sets, and dropping one or more search space sets based on a linkage between search space sets further includes dropping the first search space set or the second search space set in priority.

According to some embodiments, when determining the dropping of search space sets, the search space set that has at least one linkage with one or more other search space sets is dropped in priority than the search space set that does not have any linkage with one or more other search space sets.

According to some embodiments of the present disclosure, by giving the search space set that does not have any linkage with one or more other search space sets a higher priority to be reserved, the search space sets that do not have linkages remain as much as possible, which relatively simplifies the linkage of search space sets and thus the linkage of PDCCH candidates, thereby relatively reducing the complexity.

According to some embodiments, dropping one or more search space sets further includes dropping one or more search space sets based on indexes of search space sets and the linkage between search space sets.

According to some embodiments, in the case that the search space set that does not have any linkage with one or more other search space sets is dropped in priority than the search space set that has at least one linkage with one or more other search space sets, if the capability of monitoring PDCCH candidates can still not be met after dropping all the search space sets that do not have any linkage with other search space sets, the UE may start to drop the remaining one or more search space sets that have linkage with other search space sets.

According to some embodiments, the UE may perform indexing on the remaining one or more search space sets that have linkage with other search space sets according to time order for example. In some embodiments, the UE may drop the search space set with larger index in priority. In some embodiments, the UE may drop the search space set with smaller index in priority.

According to some embodiments, one search space set and its linked search space set may be considered as a pair of search space sets, and the pair of search space sets may have a unique index for these two search space sets. In some embodiments, the index of the pair of search space sets may be equal to the larger one of the index of the search space set and the index of its linked search space set. In some embodiments, the index of the pair of search space sets may be equal to the smaller one of the index of the search space set and the index of its linked search space set.

According to some embodiments of the present disclosure, by considering both the linkage between search space sets and the indexes of search space sets as discussed above, the UE may first drop search space sets that does not have any linkage, and then drop the search space set with higher indexes, which enhances the PDCCH reliability as much as possible and simplifies the dropping at the same time.

According to some embodiments, dropping one or more search space sets further includes: dropping one or more search space sets only based on indexes of search space sets.

According to some embodiments, no matter a search space set has a linkage with other search space set, the UE drops one or more search space sets only based on indexes of search space sets. In some embodiments, the UE may drop the search space set with larger index in priority. In some embodiments, the UE may drop the search space set with smaller index in priority.

According to some embodiments of the present disclosure, by dropping one or more search space sets only based on indexes of search space sets without considering the linkage between search space sets, the dropping of search space sets is simplified, thereby reducing the complexity.

According to some embodiments, dropping one or more search space sets further includes: in response to dropping the first search space set, dropping the second search space set that is linked to the first search space set.

According to some embodiments, when detecting the overbooking of PDCCH candidates, if one search space set is dropped, the UE may also drop its linked search space set.

According to some embodiments of the present disclosure, dropping both the search space set and the linked search space set simplifies the linkage and reducing the actual BD operations.

According to some embodiments, dropping one or more search space sets further includes: in response to dropping the first search space set, determining whether to drop the second search space set that is linked to the first search space set based on a ranking of remaining search space sets.

According to some embodiments, when detecting the overbooking of PDCCH candidates, if one search space set is dropped, the UE may not drop its linked search space set. In some embodiments, the UE determines whether to drop the second search space set that is linked to the first search space set based on a ranking of remaining search space sets. In some embodiments, the ranking may be determined based on indexes of search space sets and/or the linkage between search space sets.

In some embodiments, for blind decoding one PDCCH candidate in the search space set that is dropped and the linked PDCCH candidate in the linked search space set that is not dropped, the counting of the number of BD may be equal to 1.

According to some embodiments of the present disclosure, when one search space set is dropped, by still considering the linked search space set, the usage of the received search space sets is increased.

According to some embodiments of the present disclosure, upon determining a PDCCH from a plurality of PDCCH candidate, the UE may receive aperiodic signal or information from the network device. For example, the aperiodic signal or information may include aperiodic channel state information-reference signal (CSI-RS), PDSCH, etc.

According to some embodiments, the UE may need some time to decode a downlink control information (DCI) to determine a PDCCH candidate as PDCCH. In some embodiments, the DCI is used to schedule the aperiodic signal or information including AP-CSI-RS, PDSCH, etc. For example, the UE may use 5 symbols to decode DCI, but the present disclosure does not limit to this, and the UE may use any suitable number of symbols for decoding DCI. In some embodiments, before the end of decoding the DCI, the UE does not know if there is any aperiodic signal or information including AP-CSI-RS, PDSCH, etc., and therefore the UE needs to buffer some symbols.

According to some embodiments, the timing of receiving AP-CSI-RS and PDSCH may be restricted according to the time of receiving PDCCH candidate.

Figure 4A:
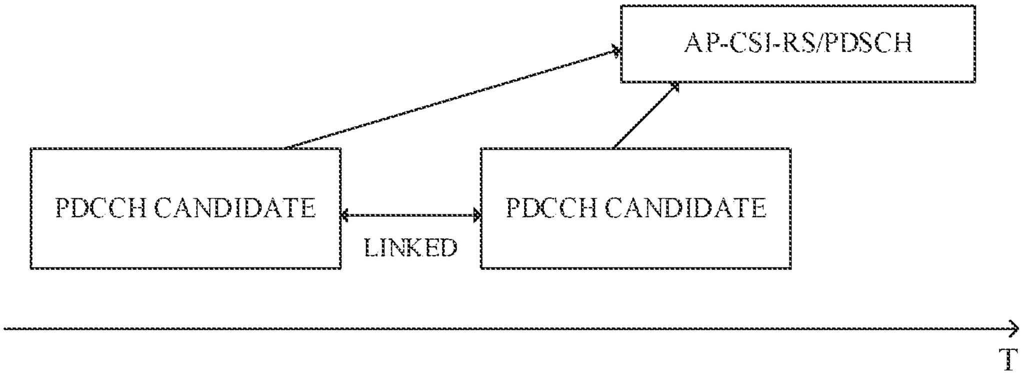
FIG. 4A illustrates an exemplary diagram showing illustrative relations in time domain among aperiodic signal and linked two PDCCH candidates.
Figure 4B:
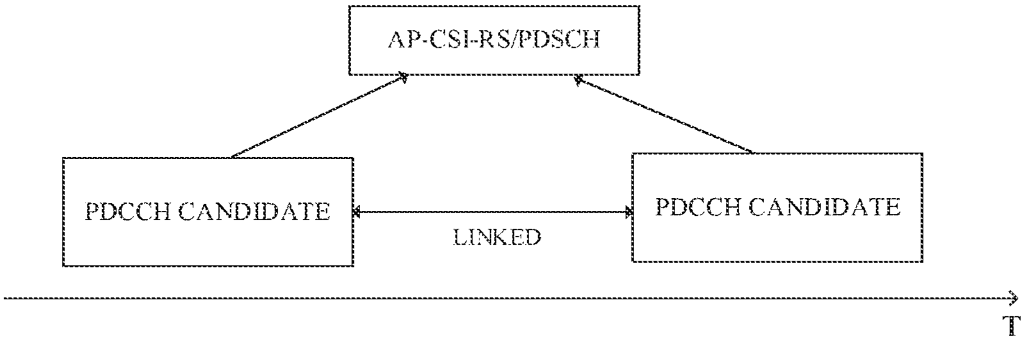
FIG. 4B illustrates an exemplary diagram showing illustrative relations in time domain among aperiodic signal and linked two PDCCH candidates.
Figure 4C:
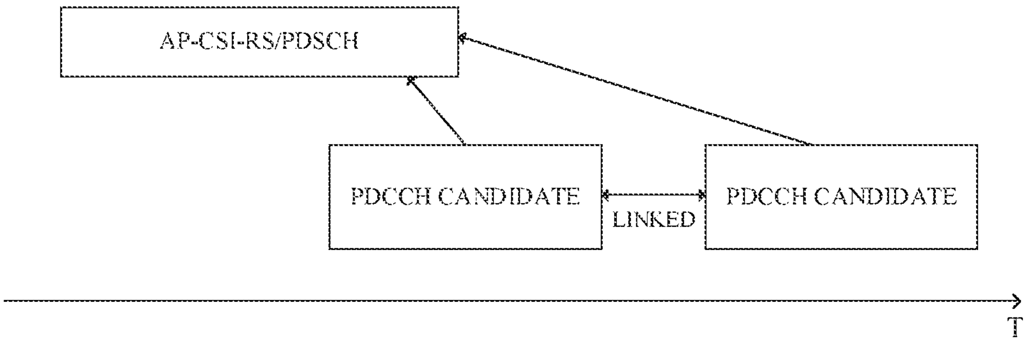
FIG. 4C illustrates an exemplary diagram showing illustrative relations in time domain among aperiodic signal and linked two PDCCH candidates.

FIGS. 4A-4C shows three different relations in time domain among aperiodic signal (e.g., AP-CSI-RS and PDSCH) and linked PDCCH candidates.

In particular, FIG. 4A illustrates an exemplary diagram showing illustrative relations in time domain among aperiodic signal and linked two PDCCH candidates, where the aperiodic signal is received after the UE receives both the earlier PDCCH candidate and the later PDCCH candidate (the earlier PDCCH and the later PDCCH candidate are linked).

FIG. 4B illustrates an exemplary diagram showing illustrative relations in time domain among aperiodic signal and linked two PDCCH candidates, where the aperiodic signal is received after the UE receives the earlier PDCCH candidate but before the UE receives the later PDCCH candidate (the earlier PDCCH and the later PDCCH candidate are linked).

FIG. 4C illustrates an exemplary diagram showing illustrative relations in time domain among aperiodic signal and linked two PDCCH candidates, where the aperiodic signal is received before the UE receives both the earlier PDCCH candidate and the later PDCCH candidate (the earlier PDCCH and the later PDCCH candidate are linked).

According to some embodiments, the first PDCCH candidate for the first search space set is earlier than the first PDCCH candidate for the second search space set in time domain, and the method further including: obtaining an aperiodic channel state information-reference signal (CSI-RS) from the network device no earlier than the first PDCCH candidate for the second search space set in time domain.

According to some embodiments, the AP-CSI-RS cannot be received before neither the earlier PDCCH candidate (i.e., the first PDCCH candidate for the first search space set) nor the linked later PDCCH candidate (i.e., the first PDCCH candidate for the second search space set). In some embodiment, both the earlier PDCCH candidate and the linked later PDCCH candidate may trigger the corresponding AP-CSI-RS.

It should be noted that, in the above embodiments, illustrative relations in time domain among AP-CSI-RS and linked two PDCCH candidates shown by FIG. 4A are allowed, but illustrative relations in time domain among AP-CSI-RS and linked two PDCCH candidates shown by FIG. 4B and FIG. 4C are not allowed.

According to some embodiments of the present disclosure, the UE receives the linked two PDCCH candidates that trigger the AP-CSI-RS before receiving the corresponding AP-CSI-RS, which enhances the PDCCH reliability and provides a predictable time for buffering for UE.

According to some embodiments, the first PDCCH candidate for the first search space set is earlier than the first PDCCH candidate for the second search space set in time domain, and the method further including: obtaining an aperiodic channel state information-reference signal (CSI-RS) from the network device no earlier than the first PDCCH candidate for the first search space set in time domain.

According to some embodiments, the AP-CSI-RS cannot be received before the earlier PDCCH candidate (i.e., the first PDCCH candidate for the first search space set) but can be received before the linked later PDCCH candidate (i.e., the first PDCCH candidate for the second search space set). In some embodiment, both the earlier PDCCH candidate and the linked later PDCCH candidate may trigger the corresponding AP-CSI-RS.

It should be noted that, according to the above embodiments, illustrative relations in time domain among AP-CSI-RS and linked two PDCCH candidates shown by FIG. 4A and FIG. 4B are allowed, but illustrative relations in time domain among AP-CSI-RS and linked two PDCCH candidates shown by FIG. 4C are not allowed.

According to some embodiments of the present disclosure, the UE receives AP-CSI-RS after receiving the earlier PDCCH candidate of the linked two PDCCH candidates, which advances the receiving of AP-CSI-RS as much as possible and provides a predictable time for buffering for UE.

According to some embodiments of the present disclosure, PDSCH may include PDSCH with mapping type A and PDSCH with mapping type B.

According to some embodiments, the UE may not be expected to receive a PDSCH with mapping type A in a slot, if the PDCCH scheduling the PDSCH was received in the same slot and was not contained within the first three symbols of the slot.

According to some embodiments, for scheduling a PDSCH with mapping type A, the first PDCCH candidate for the first search space set has to be received within the first predetermined number of symbols of a first slot, and the first PDCCH candidate for the second search space set has to be received within the first predetermined number of symbols of a second slot.

According to some embodiments, when the first PDCCH candidate of the first search space set is linked to the first PDCCH candidate of the second search space set, wherein the linked PDCCH candidate is used to schedule PDSCH with mapping type A, both the first PDCCH candidate of the first search space set and the linked first PDCCH candidate of the second search space set have to be received within a predetermined number of symbols at the beginning of their corresponding slots. One example of predetermined number of symbols is 3.

According to some embodiments, both the earlier PDCCH candidate and the linked later PDCCH candidate are received within the predetermined number of symbols (e.g., 3 symbols) at the beginning of respective slots. In addition, the PDSCH with mapping type A cannot be received before neither the earlier PDCCH candidate (i.e., the first PDCCH candidate for the first search space set) nor the linked later PDCCH candidate (i.e., the first PDCCH candidate for the second search space set). In some embodiment, both the earlier PDCCH candidate and the linked later PDCCH candidate may trigger the corresponding PDSCH with mapping type A.

It should be noted that, according to the above embodiments, illustrative relations in time domain among PDSCH with mapping type A and linked two PDCCH candidates shown by FIG. 4A are allowed, but illustrative relations in time domain among PDSCH with mapping type A and linked two PDCCH candidates shown by FIG. 4B and FIG. 4C are not allowed.

According to some embodiments of the present disclosure, the UE receives the linked two PDCCH candidates that trigger the PDSCH with mapping type A before receiving the corresponding PDSCH with mapping type A, which enhances the PDCCH reliability and provides a predictable time for buffering for UE.

According to some embodiments, for scheduling a PDSCH with mapping type A, only the first PDCCH candidate for the second search set has to be received within the first predetermined number of symbols of a second slot.

According to some embodiments, when the first PDCCH candidate of the first search space set is linked to the first PDCCH candidate of the second search space set, wherein the first slot is earlier than the second slot in time domain. When the linked PDCCH candidate is used to schedule PDSCH with mapping type A, the later PDCCH candidate of the second search space set has to be received within a predetermined number of symbols at the beginning of slot. One example of predetermined number of symbols is 3.

According to some embodiments, the linked later PDCCH candidate are received within the predetermined number of symbols (e.g., 3 symbols) at the beginning of its slot, but there is no restriction for the beginning symbol of the earlier PDCCH candidate. In addition, the PDSCH with mapping type A cannot be received before neither the earlier PDCCH candidate (i.e., the first PDCCH candidate for the first search space set) nor the linked later PDCCH candidate (i.e., the first PDCCH candidate for the second search space set). In some embodiment, both the earlier PDCCH candidate and the linked later PDCCH candidate may trigger the corresponding PDSCH with mapping type A.

According to some embodiments of the present disclosure, the UE receives PDSCH with mapping type A after receiving the earlier PDCCH candidate of the linked two PDCCH candidates, which advances the receiving of PDSCH with mapping type A as much as possible and provides a predictable time for buffering for UE.

According to some embodiments, the first PDCCH candidate for the first search space set is within a predetermined number of symbols at the beginning of a first slot and the first PDCCH candidate for the second search space set is within the predetermined number of symbols at the beginning of a second slot, wherein the first slot is earlier than the second slot in time domain, and the method further including: obtaining a physical downlink share channel (PDSCH) from the network device no earlier than the first PDCCH candidate for the first search space set in time domain, wherein the PDSCH is a PDSCH with mapping type A.

According to some embodiments, the first PDCCH candidate for the first search space set is within a first slot and the first PDCCH candidate for the second search space set is within a predetermined number at the beginning of symbols of a second slot, wherein the first slot is earlier than the second slot in time domain, and the method further including: obtaining a physical downlink share channel (PDSCH) from the network device no earlier than the first PDCCH candidate for the first search space set in time domain, wherein the PDSCH is a PDSCH with mapping type A.

According to some embodiments, the UE may not be expected to receive a PDSCH with mapping type B in a slot, if the first symbol of the PDCCH scheduling the PDSCH was received in a later symbol than the first symbol indicated in the PDSCH time domain resource allocation.

According to some embodiments, wherein the first PDCCH candidate for the first search space set is earlier than the first PDCCH candidate for the second search space set in time domain, and the method further including: obtaining a physical downlink share channel (PDSCH) from the network device no earlier than the first PDCCH candidate for the second search space set in time domain, wherein the PDSCH is a PDSCH with mapping type B.

According to some embodiments, the PDSCH with mapping type B cannot be received before neither the earlier PDCCH candidate (i.e., the first PDCCH candidate for the first search space set) nor the linked later PDCCH candidate (i.e., the first PDCCH candidate for the second search space set). In some embodiment, both the earlier PDCCH candidate and the linked later PDCCH candidate may trigger the corresponding PDSCH with mapping type B.

It should be noted that, according to the above embodiments, illustrative relations in time domain among PDSCH with mapping type B and linked two PDCCH candidates shown by FIG. 4A are allowed, but illustrative relations in time domain among PDSCH with mapping type B and linked two PDCCH candidates shown by FIG. 4B and FIG. 4C are not allowed.

According to some embodiments of the present disclosure, the UE receives the linked two PDCCH candidates that trigger the PDSCH with mapping type B before receiving the corresponding PDSCH with mapping type B, which enhances the PDCCH reliability and provides a predictable time for buffering for UE.

According to some embodiments, wherein the first PDCCH candidate for the first search space set is earlier than the first PDCCH candidate for the second search space set in time domain, and the method further including: obtaining a physical downlink share channel (PDSCH) from the network device no earlier than the first PDCCH candidate for the first search space set in time domain, wherein the PDSCH is a PDSCH with mapping type B.

According to some embodiments, the PDSCH with mapping type B cannot be received before the earlier PDCCH candidate (i.e., the first PDCCH candidate for the first search space set) but can be received before the linked later PDCCH candidate (i.e., the first PDCCH candidate for the second search space set). In some embodiment, both the earlier PDCCH candidate and the linked later PDCCH candidate may trigger the corresponding PDSCH with mapping type B.

It should be noted that, according to the above embodiments, illustrative relations in time domain among PDSCH with mapping type B and linked two PDCCH candidates shown by FIG. 4A and FIG. 4B are allowed, but illustrative relations in time domain among PDSCH with mapping type B and linked two PDCCH candidates shown by FIG. 4C are not allowed.

According to some embodiments of the present disclosure, the UE receives PDSCH with mapping type B after receiving the earlier PDCCH candidate of the linked two PDCCH candidates, which advances the receiving of PDSCH with mapping type B as much as possible and provides a predictable time for buffering for UE.

Figure 5:
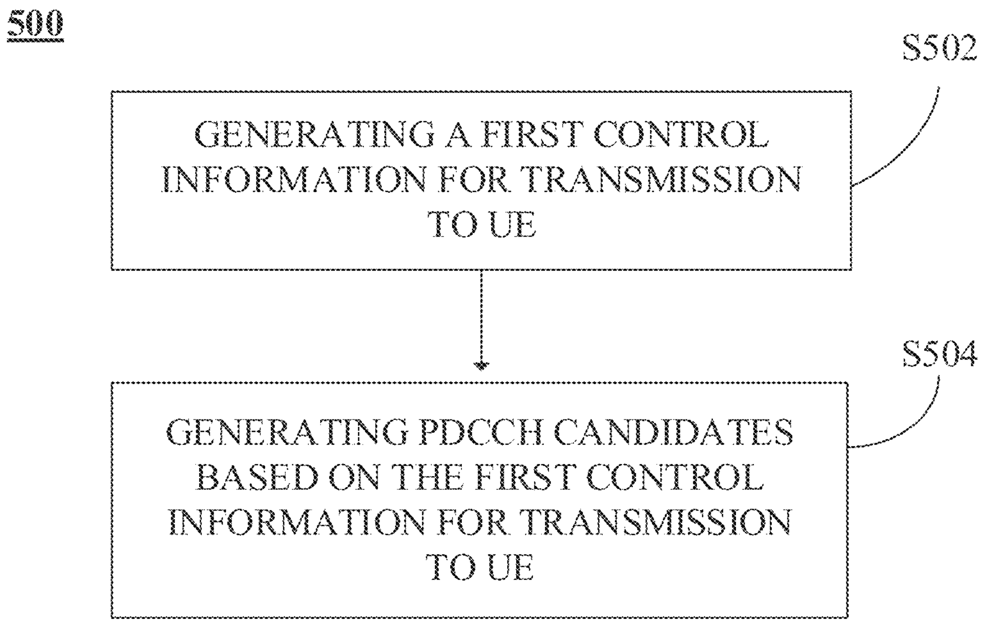
FIG. 5 illustrates a flowchart for an exemplary method for a network device in accordance with some embodiments.

FIG. 5 illustrates a flowchart for an exemplary method for a network device in accordance with some embodiments. The method 500 illustrated in FIG. 5 may be implemented by the base station 150 described in FIG. 1. For example, the network device may be the network device of the base station 150.

In some embodiments, the method 500 for a network device may include the following steps: S502, generating a first control information for transmission to a user equipment (UE), wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and S504, generating PDCCH candidates based on the first control information for transmission to the UE.

In the following, each step of the method 500 will be described. Note that those elements, expressions, features etc. that have already been described with reference to FIG. 2 and its corresponding description (about UE) are omitted herein for clarity.

At step S502, the network device generates a first control information to a user equipment (UE), wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked.

At step S504, the network device generates PDCCH candidates based on the first control information for transmission to the UE.

According to some embodiments of the present disclosure, by transmitting the first control information that indicates the linkage between the first search space set and the second search space set and the linkage between the first PDCCH candidate for the first search space set and the first PDCCH candidate for the second search space from the network device, the network device configures the repetition of PDCCH for the UE due to the above linkages and thus the maximum duration of PDCCH is increased. That is, the number of symbols used for PDCCH is increased, which means the time and the energy accumulated for transmitting PDCCH are increased, thereby enhancing the PDCCH reliability for multi-TRP operation.

Note that those elements, expressions, features etc. that have already been described with reference to FIGS. 3A-3B and 4A-4C and their corresponding description (about UE) are omitted herein for clarity.

Figure 6:
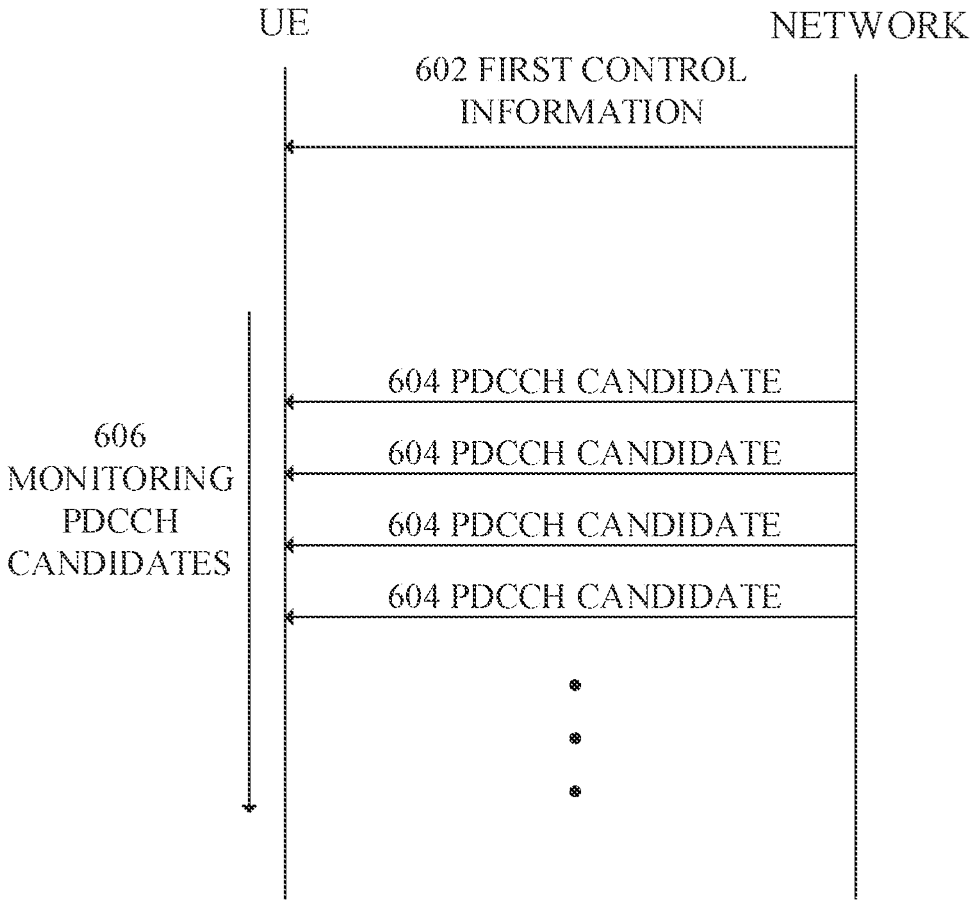
FIG. 6 illustrates a flowchart for exemplary steps for PDCCH reliability enhancement in accordance with some embodiments.

FIG. 6 illustrates a flowchart for exemplary steps for PDCCH reliability enhancement in accordance with some embodiments.

In FIG. 6, the steps of the method for UE and the method for network device to enhance PDCCH reliability for multi-TRP operation are shown.

At Step 602, the UE may transmit a first control information to the network device. The first control information indicates the linkage between search space sets and the linkage between PDCCH candidates. Specifically, the first control information indicates a plurality of search space sets including a first search space set and a second search space set, wherein the first search space set and the second search space set are linked, wherein the first search space set includes a first PDCCH candidate for the first search space set and the second search space set includes a first PDCCH candidate for the second search space set, and wherein the first PDCCH candidate for the first search space set and the first PDCCH candidate for the second search space set are linked. Step 602 call be implemented according to the description with reference to Step S202 and/or Step S502.

At Step 604, the network device may periodically transmit a plurality of PDCCH candidates in a predetermined period to UE. Only one or some of PDCCH candidates may become PDCCH(s) for UE. Step 604 can be implemented according to the description with reference to Step S504.

At Step 606, the UE may monitor the plurality of PDCCH candidates transmitted from the network device. Monitoring the plurality of PDCCH candidates include blind decoding the plurality of PDCCH candidates. During the blind decoding, if UE finds that one or some PDCCH candidates carry DCI, then the one or some PDCCH candidates may become PDCCH(s). Step 606 can be implemented according to the description with reference to Step S204.

Note that Step 604 and Step 606 are performed at the same time.

Figure 7:
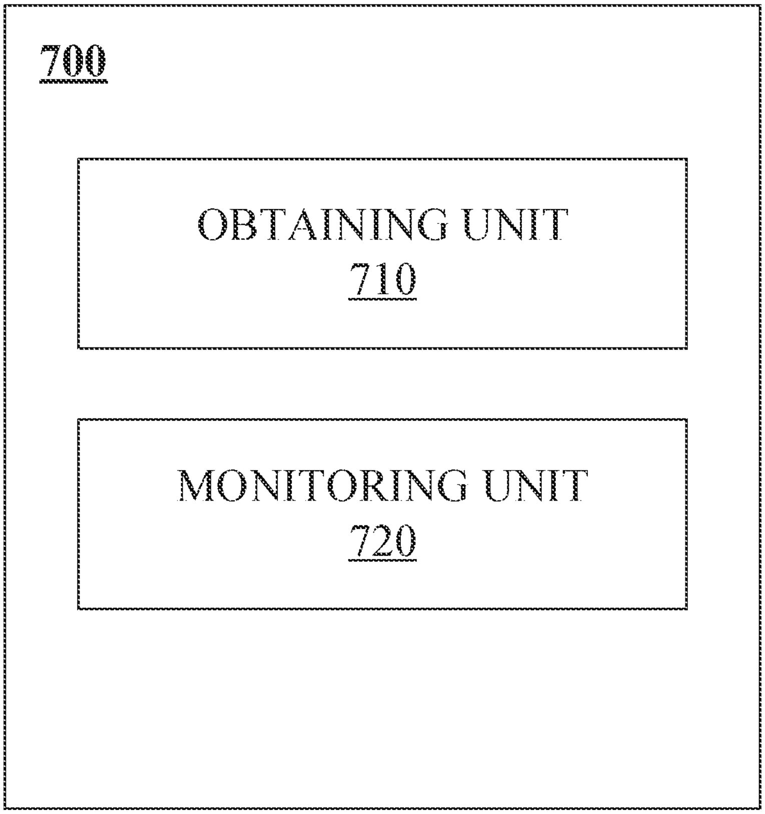
FIG. 7 illustrates an exemplary block diagram of an apparatus for a UE in accordance with some embodiments.

FIG. 7 illustrates an exemplary block diagram of an apparatus for a UE in accordance with some embodiments. The apparatus 700 illustrated in FIG. 7 may be used to implement the method 200 as illustrated in combination with FIG. 2.

As illustrated in FIG. 7, the apparatus 700 includes an obtaining unit 710 and a monitoring unit 720.

The obtaining unit 710 may be configured to obtain a first control information from a network device, wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked and monitor PDCCH candidates based on the first control information.

The monitoring unit 720 may be configured to monitor PDCCH candidates based on the first control information.

According to the embodiments of the present application, by receiving the first control information that indicates the linkage between the first search space set and the second search space set and the linkage between the first PDCCH candidate for the first search space set and the first PDCCH candidate for the second search space from the network device, the repetition of PDCCH for the UE is allowed due to the above linkages and thus the maximum duration of PDCCH is increased. That is, the number of symbols used for PDCCH is increased, which means the time and the energy accumulated for transmitting PDCCH are increased, thereby enhancing the PDCCH reliability for multi-TRP operation.

Figure 8:
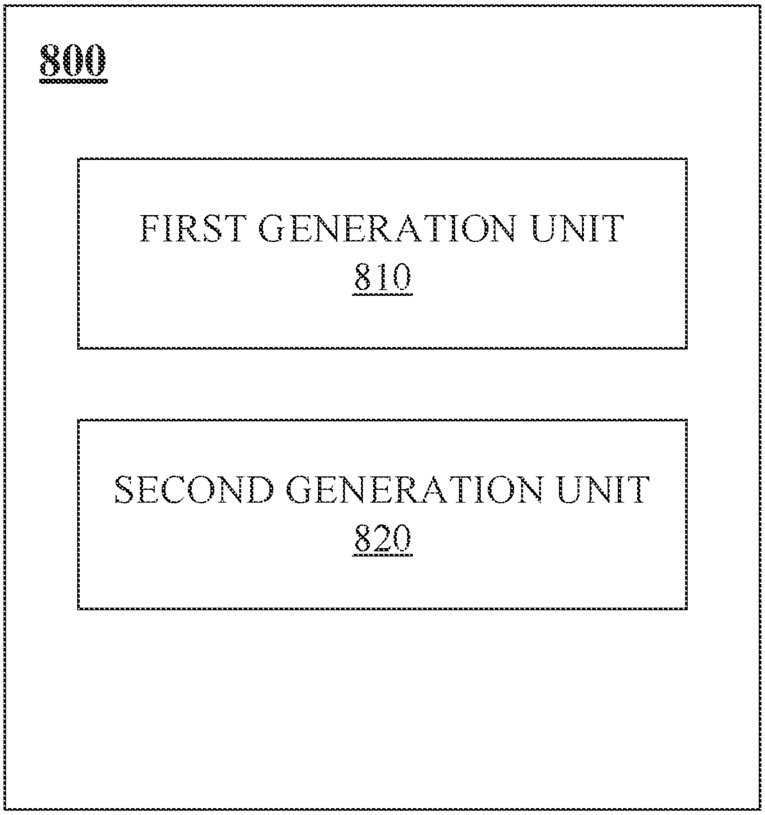
FIG. 8 illustrates an exemplary block diagram of an apparatus for a network device in accordance with some embodiments.

FIG. 8 illustrates an exemplary block diagram of an apparatus for a network device in accordance with some embodiments. The apparatus 800 illustrated in FIG. 8 may be used to implement the method 500 as illustrated in combination with FIG. 5.

As illustrated in FIG. 8, the apparatus 800 includes a first generation unit 810 and a second generation unit 820.

The first generation unit 810 may be configured to generate a first control information for transmission to a user equipment (UE), wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked.

The second generation unit 820 may be configured to generate PDCCH candidates based on the first control information for transmission to the UE.

According to some embodiments of the present disclosure, by transmitting the first control information that indicates the linkage between the first search space set and the second search space set and the linkage between the first PDCCH candidate for the first search space set and the first PDCCH candidate for the second search space from the network device, the network device configures the repetition of PDCCH for the UE due to the above linkages and thus the maximum duration of PDCCH is increased. That is, the number of symbols used for PDCCH is increased, which means the time and the energy accumulated for transmitting PDCCH are increased, thereby enhancing the PDCCH reliability for multi-TRP operation.

Figure 9:
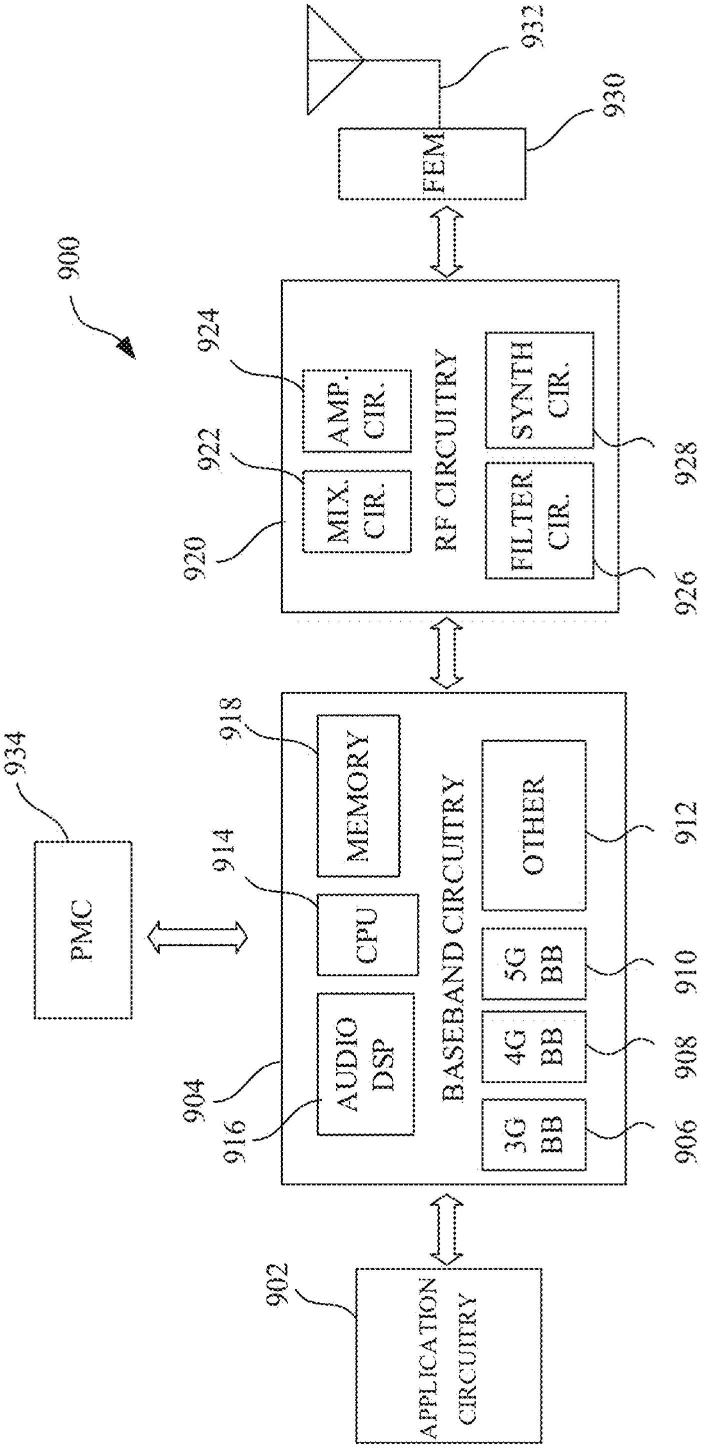
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based oil a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
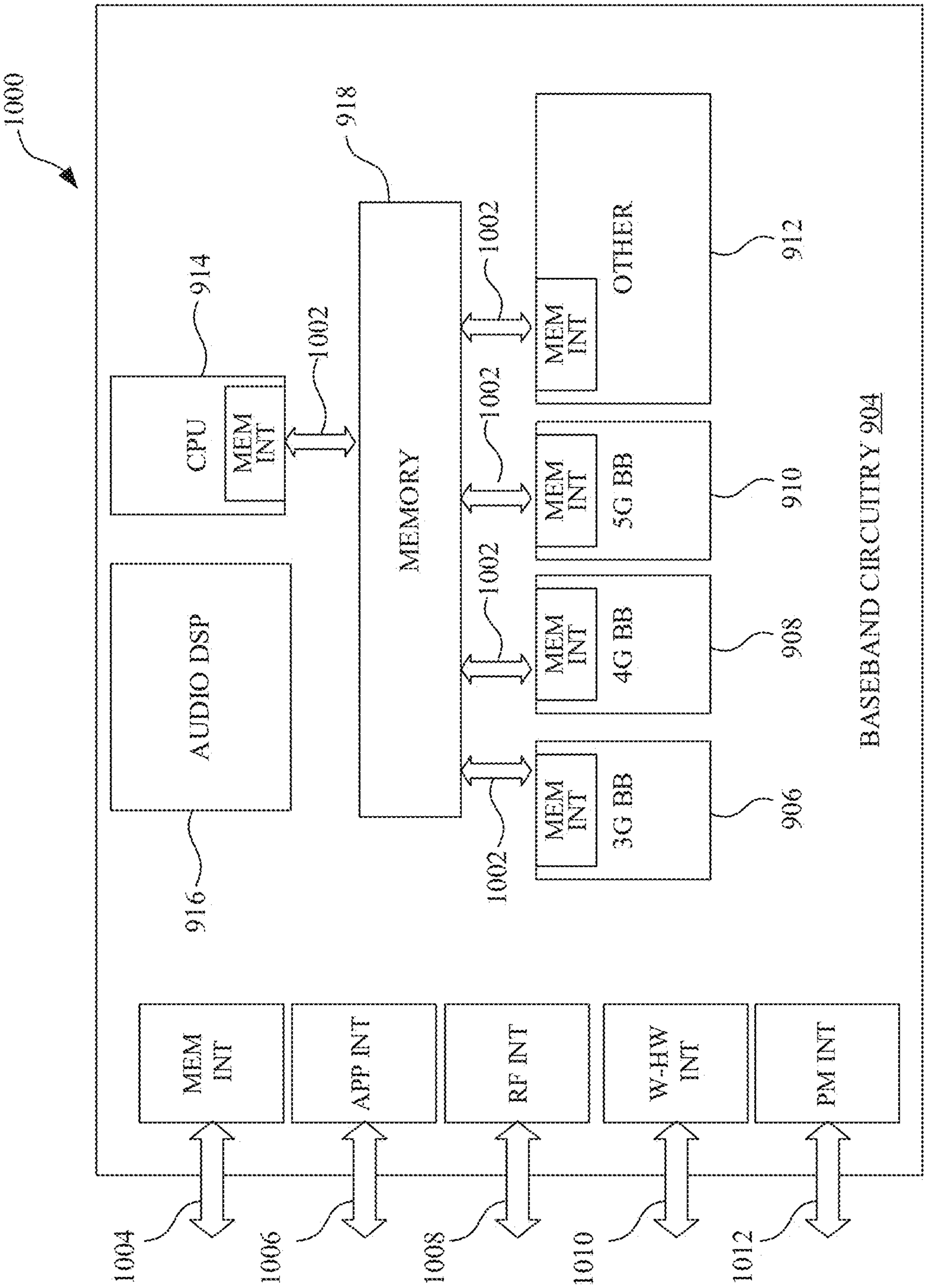
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor (s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
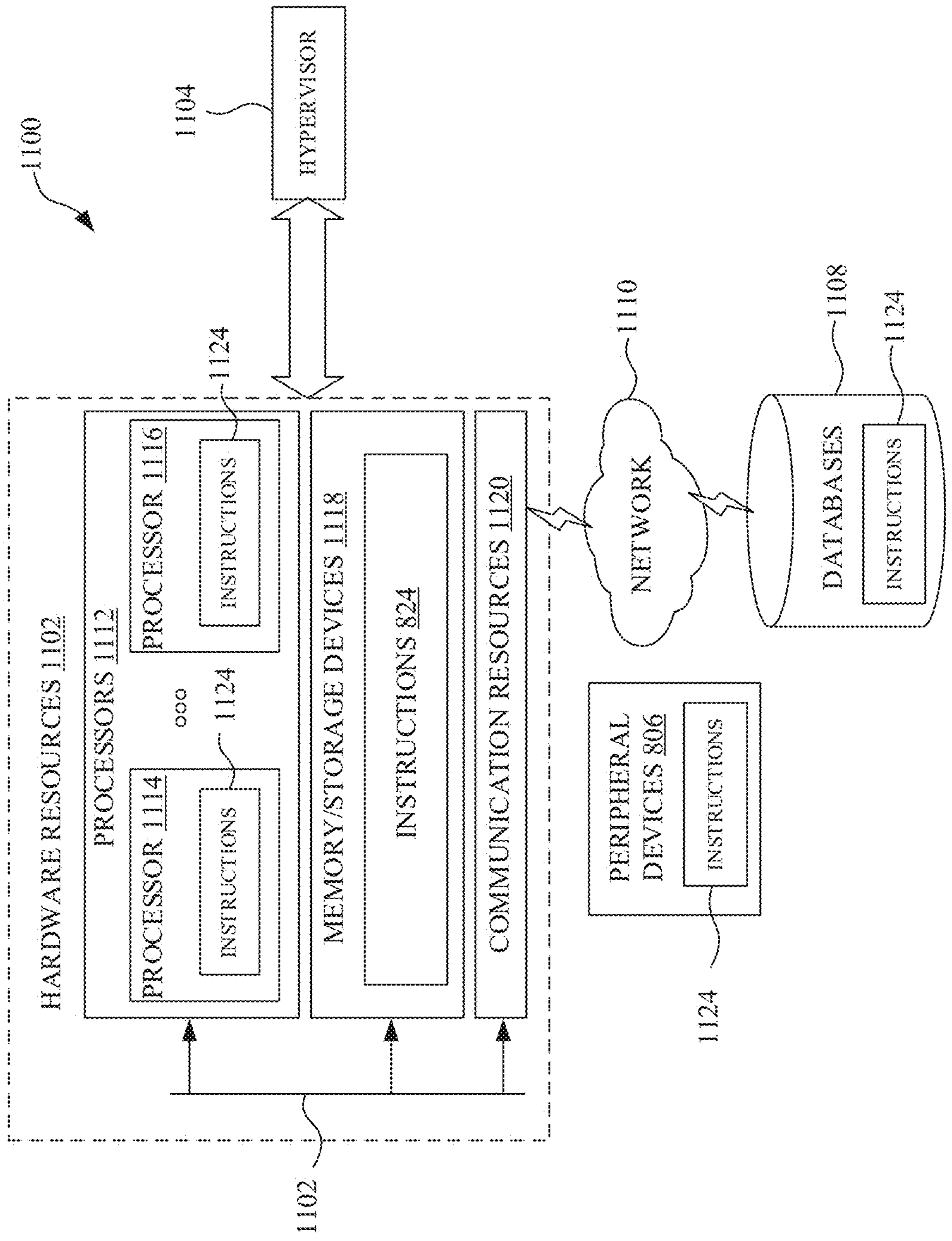
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
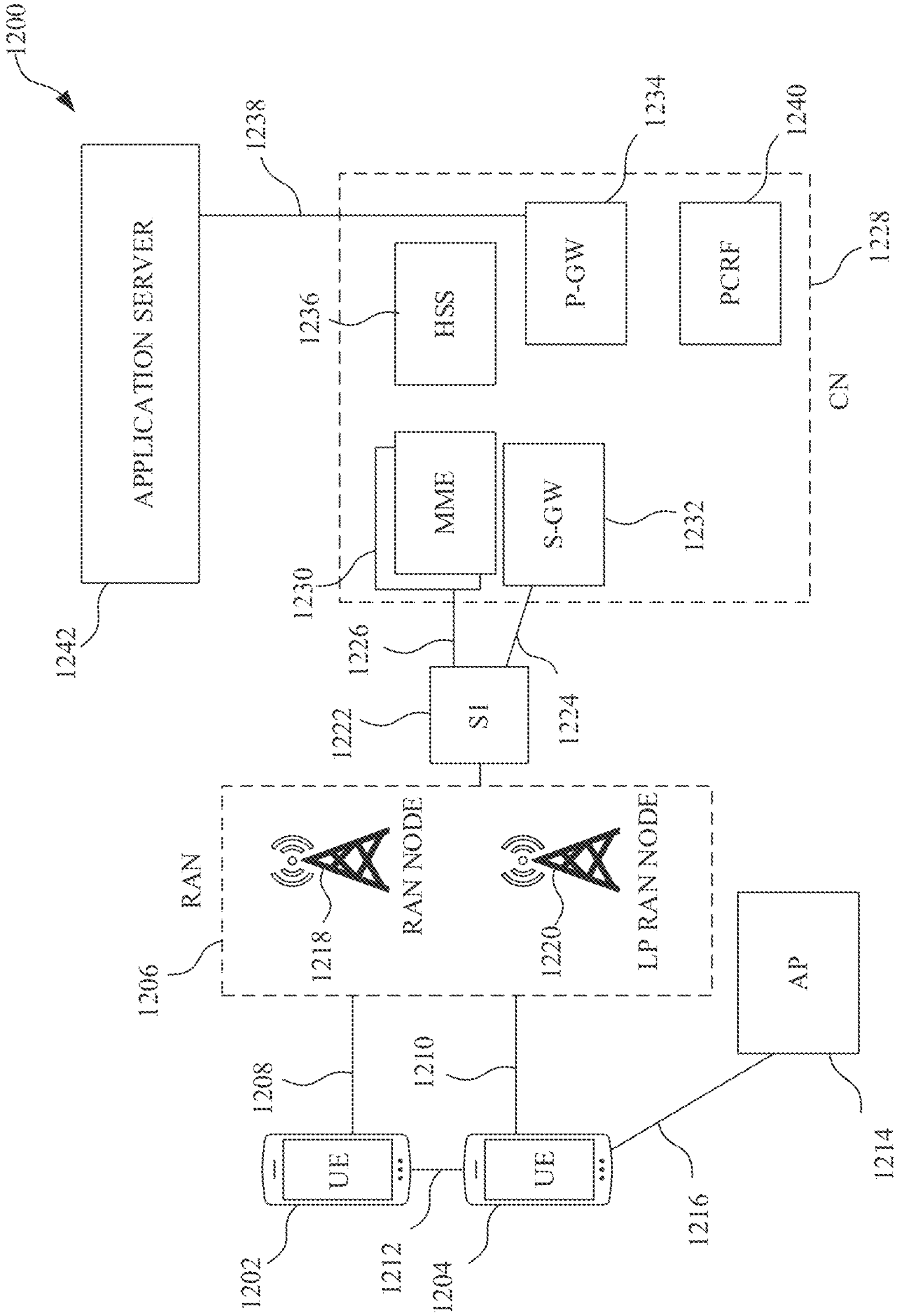
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can include a local wireless connection, such as a connection consistent with any IEEE 802.11 protocol, wherein the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an SI interface 1222. In embodiments, the CN 1228 may be an evolved packet core (EPC) network, a NextGen Packet Core (NPC) network, or some other type of CN. In this embodiment the SI interface 1222 is split into two parts: the SI-U interface 1224, which carries traffic data between the macro RAN node 1218 and the LP RAN node 1220 and a serving gateway (S-GW), shown as S-GW 1132, and an SI-mobility management entity (MME) interface, shown as SI-MME interface 1226, which is a signaling interface between the macro RAN node 1218 and LP RAN node 1220 and the MME(s) 1230.

In this embodiment, the CN 1228 includes the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities' handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the SI interface 1222 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QoS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), including: obtaining a first control information from a network device, wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and monitoring PDCCH candidates based on the first control information.

Example 2 is the method of Example 1, wherein the first PDCCH candidate for the first search space set is dropped, and wherein monitoring PDCCH candidates based on the first control information further includes: monitoring the first PDCCH candidate for the second search space set, without monitoring the first PDCCH candidate for the first search space set that is linked to the first PDCCH candidate for the second search space set.

Example 3 is the method of Example 1, wherein the first PDCCH candidate for the first search space set is dropped, and wherein monitoring PDCCH candidates based on the first control information further includes: neither monitoring the first PDCCH candidate for the first search space set, nor monitoring the first PDCCH candidate for the second search space set that is linked to the first PDCCH candidate for the second search space set.

Example 4 is the method of Example 2, wherein monitoring PDCCH candidates based on the first control information further comprises still counting blind decoding for both the first PDCCH candidate for the first search space set and the first PDCCH candidate for the second search space set, and wherein the number of blind decoding is counted based on a capability of the UE.

Example 5 is the method of Example 4, wherein the capability of the UE indicates that the UE supports joint blind decoding; and wherein the number of blind decoding is counted as 3 although the UE blind decodes the first PDCCH candidate for the second search space set and does not blind decodes the first PDCCH candidate for the first search space set.

Example 6 is the method of Example 4, wherein the capability of the UE indicates that the UE does not support joint blind decoding; and wherein the number of blind decoding is counted as 2 although the UE blind decodes the first PDCCH candidate for the second search space set and does not blind decode the first PDCCH candidate for the first search space set.

Example 7 is the method of Example 2, wherein monitoring the first PDCCH candidate for the second search space set without monitoring the first PDCCH candidate for the first search space set further includes blind decoding the first PDCCH candidate for the second search space set without blind decoding the first PDCCH candidate for the first search space set; and wherein the number of blind decoding is counted as 1 for blind decoding the first PDCCH candidate for the second search space set without blind decoding the first PDCCH candidate for the first search space set.

Example 8 is the method of Example 3, wherein neither monitoring the first PDCCH candidate for the first search space set nor monitoring the first PDCCH candidate for the second search space set further includes neither blind decoding the first PDCCH candidate for the first search space set nor blind decoding the first PDCCH candidate for the second search space set; and wherein the number of blind decoding is counted as 0 for neither blind decoding the first PDCCH candidate for the first search space set nor blind decoding the first PDCCH candidate for the second search space set.

Example 9 is the method of Example 1, further including: detecting an overbooking of PDCCH candidates based on the first control information; and in response to detecting the overbooking of PDCCH candidates, dropping one or more search space sets of the plurality of search space sets.

Example 10 is the method of Example 9, wherein dropping one or more search space sets further includes: dropping one or more search space sets based on a linkage between search space sets.

Example 11 is the method of Example 10, wherein the plurality of search space sets further include a third search space set, wherein the third search space set is not linked to any search space set of the plurality of search space sets; and wherein dropping one or more search space sets based on a linkage between search space sets further includes dropping the third search space set in priority.

Example 12 is the method of Example 10, wherein the plurality of search space sets further include a third search space set, wherein the third search space set is not linked to any search space set of the plurality of search space sets; and wherein dropping one or more search space sets based on a linkage between search space sets further includes dropping the first search space set or the second search space set in priority.

Example 13 is the method of Example 10, wherein dropping one or more search space sets further includes: dropping one or more search space sets based on indexes of search space sets and the linkage between search space sets.

Example 14 is the method of Example 9, wherein dropping one or more search space sets further includes: dropping one or more search space sets only based on indexes of search space sets.

Example 15 is the method of Example 9, wherein dropping one or more search space sets further includes: in response to dropping the first search space set, dropping the second search space set that is linked to the first search space set.

Example 16 is the method of Example 9, wherein dropping one or more search space sets further includes: in response to dropping the first search space set, determining whether to drop the second search space set that is linked to the first search space set based on a ranking of remaining search space sets.

Example 17 is the method of Example 1, wherein the first search space set includes a first plurality of PDCCH candidates for the first search space set and the second search space set includes a second plurality of PDCCH candidates for the second search space set; and wherein each PDCCH candidate of the first plurality of PDCCH candidates for the first search space set is linked to at least one PDCCH candidate of the second plurality of PDCCH candidates for the second search space set.

Example 18 is the method of Example 17, wherein each PDCCH candidate of the first plurality of PDCCH candidates for the first search space set is one-to-one linked to each PDCCH candidate of the second plurality of PDCCH candidates for the second search space set.

Example 19 is the method of Example 1, wherein the first search space set includes a first plurality of PDCCH candidates for the first search space set; and wherein one or more PDCCH candidates of the first plurality of PDCCH candidates for the first search space set are not linked to any PDCCH candidate in the second search space set.

Example 20 is the method of Example 1, wherein the first search space set is only linked to the second search space set.

Example 21 is the method of Example 1, wherein the first search space set is linked to the second search space set and one or more search space sets that are different from the first search space set and the second search space set of the plurality of search space sets.

Example 22 is the method of Example 1, wherein the first search space set includes in time domain a first plurality of search spaces that are periodically repeated in a first period and the second search space set includes in time domain a second plurality of search spaces that are periodically repeated in a second period; and wherein the first period is same as the second period.

Example 23 is the method of Example 22, wherein a linkage between a first search space of the first search space set and a first search space of the second search space set in time domain is configured by the network device.

Example 24 is the method of Example 22, wherein a linkage between a first search space of the first search space set and a first search space of the second search space set in time domain is determined according to proximity to an absolute timing.

Example 25 is the method of Example 1, wherein the first search space set includes in time domain a first plurality of search spaces that are periodically repeated in a first period and the second search space set includes in time domain a second plurality of search spaces that are periodically repeated in a second period; and wherein the first period is shorter than the second period.

Example 26 is the method of Example 25, wherein a search space of the first search space set is not linked to any search space of the second search space set; and wherein monitoring PDCCH candidates based on the first control information further includes: not monitoring PDCCH candidates in the search space of the first search space set that is not linked to any search space of the second search space set.

Example 27 is the method of Example 25, wherein a search space of the first search space set is not linked to any search space of the second search space set; and wherein monitoring PDCCH candidates based on the first control information further includes: monitoring PDCCH candidates in the search space of the first search space set that is not linked to any search space of the second search space set.

Example 28 is the method of Example 1, wherein the first PDCCH candidate for the first search space set is earlier than the first PDCCH candidate for the second search space set in time domain; and wherein the method further includes: obtaining an aperiodic channel state information-reference signal (CSI-RS) from the network device no earlier than the first PDCCH candidate for the second search space set in time domain.

Example 29 is the method of Example 1, wherein the first PDCCH candidate for the first search space set is earlier than the first PDCCH candidate for the second search space set in time domain; and wherein the method further including: obtaining an aperiodic channel state information-reference signal (CSI-RS) from the network device no earlier than the first PDCCH candidate for the first search space set in time domain.

Example 30 is the method of Example 1, wherein for scheduling a PDSCH with mapping type A, the first PDCCH candidate for the first search space set has to be received within the first predetermined number of symbols of a first slot, and the first PDCCH candidate for the second search space set has to be received within the first predetermined number of symbols of a second slot.

Example 31 is the method of Example 1, wherein for scheduling a PDSCH with mapping type A, wherein only the first PDCCH candidate for the second search set has to be received within the first predetermined number of 3 symbols of a second slot Example 32 is the method of Example 1, wherein the first PDCCH candidate for the first search space set is earlier than the first PDCCH candidate for the second search space set in time domain; and wherein the method further including: obtaining a physical downlink share channel (PDSCH) from the network device no earlier than the first PDCCH candidate for the second search space set in time domain, wherein the PDSCH is a PDSCH with mapping type B.

Example 33 is the method of Example 1, wherein the first PDCCH candidate for the first search space set is earlier than the first PDCCH candidate for the second search space set in time domain; and wherein the method further including: obtaining a physical downlink share channel (PDSCH) from the network device no earlier than the first PDCCH candidate for the first search space set in time domain, wherein the PDSCH is a PDSCH with mapping type B.

Example 34 is a method for a network device, including: generating a first control information for transmission to a user equipment (UE), wherein the first control information indicates a plurality of search space sets including a first search space set and a second search space set, wherein the first search space set and the second search space set are linked, wherein the first search space set includes a first physical downlink control channel (PDCCH) candidate for the first search space set and the second search space set includes a first PDCCH candidate for the second search space set, and wherein the first PDCCH candidate for the first search space set and the first PDCCH candidate for the second search space set are linked; and generating PDCCH candidates based on the first control information for transmission to the UE.

Example 35 is an apparatus for a user equipment (UE), the apparatus including: one or more processors configured to perform steps of the method according to any of Examples 1-33.

Example 36 is an apparatus for a network device, the apparatus including: one or more processors configured to perform steps of the method according to Example 34.

Example 37 is a computer readable medium having computer programs stored thereon which, when executed by one or more processors, cause an apparatus to perform steps of the method according to any of Examples 1-34.

Example 38 is an apparatus for a communication device, including means for performing steps of the method according to any of Examples 1-34.

Example 39 is a computer program product includes computer programs which, when executed by one or more processors, cause an apparatus to perform steps of the method according to any of Examples 1-34.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processing circuitry to:

obtain control information from a network device, wherein the control information is to configure a plurality of search space sets and is to indicate a linkage between a first search space set of the plurality of search space sets and a second search space set of the plurality of search space sets, wherein a first physical downlink control channel (PDCCH) candidate in the first search space set is linked with a first PDCCH candidate in the second search space set;

determine the first PDCCH candidate in the first search space set is dropped;

count a number of blind decoding for both the first PDCCH candidate in the first search space set and the first PDCCH candidate in the second search space set as two or three;

determine the number of blind decoding does not exceed a user equipment (UE) capability of monitoring PDCCH candidates;

monitor the first PDCCH candidate in the second search space without monitoring the first PDCCH candidate in the first search space set, wherein every PDCCH candidate in the first search space set is linked with a corresponding PDCCH candidate in the second search space set;

generate a ranking of the plurality of search space sets based on whether individual search space sets are linked search space sets or non-linked search space sets, wherein all linked search space sets are ranked either higher or lower than all non-linked search space sets; and drop one or more search space sets based on the ranking of the plurality of search space sets.

2. The one or more non-transitory, computer-readable media of claim 1, wherein the instructions, when executed, further cause the processing circuitry to:

detect an overbooking of PDCCH candidates based on the control information; and drop the one or more search space sets in response to detection of the overbooking of PDCCH candidates.

3. The one or more non-transitory, computer-readable media of claim 2, wherein the instructions, when executed, further cause the processing circuitry to:

generate the ranking of the plurality of search space sets based further on search space set indexes.

4. The one or more non-transitory, computer-readable media of claim 3, wherein all linked search space sets are ranked higher than all non-linked search space sets and the one or more search space sets are the lowest ranked search space sets of the plurality of search space sets.

5. The one or more non-transitory, computer-readable media of claim 2, wherein all linked search space sets are ranked lower than all non-linked search space sets and the one or more search space sets are the lowest ranked search space sets of the plurality of search space sets.

6. The one or more non-transitory, computer-readable media of claim 1, wherein the first search space set comprises a first plurality of PDCCH candidates and the second search space set comprises a second plurality of PDCCH candidates, and wherein each PDCCH candidate of the first plurality of PDCCH candidates is linked to no more than one PDCCH candidate of the second plurality of PDCCH candidates.

7. The one or more non-transitory, computer-readable media of claim 1, wherein the first search space set is only linked to the second search space set.

8. The one or more non-transitory, computer-readable media of claim 1, wherein the first search space set comprises, in time domain, a first plurality of search spaces that are periodically repeated in a first period and the second search space set comprises, in time domain, a second plurality of search spaces that are periodically repeated in a second period, and wherein the first period is equal to the second period.

9. The one or more non-transitory, computer-readable media of claim 1, wherein the first PDCCH candidate in the first search space set is earlier than the first PDCCH candidate in the second search space set in time domain, and the instructions, when executed, further cause the processing circuitry to:

identify an aperiodic channel state information-reference signal (CSI-RS) from the network device that is triggered by the first PDCCH candidate in the second search space set in time domain; and perform a CSI measurement based on the aperiodic CSI-RS.

10. The one or more non-transitory, computer-readable media of claim 9, wherein the first PDCCH candidate in the first search space set is earlier than the first PDCCH candidate in the second search space set in time domain, and the instructions, when executed, further cause the processing circuitry to: obtain the aperiodic CSI-RS from the network device no earlier than the first PDCCH candidate for the second search space set in time domain.

11. The one or more non-transitory, computer-readable media of claim 9, wherein a PDCCH within at least one of the one or more PDCCH candidates is to schedule a physical downlink shared channel (PDSCH) with mapping type A and the first PDCCH candidate for the first search space set is restricted to be within a first three symbols of a first slot, and the first PDCCH candidate in the second search space set is restricted to be within a first three symbols of a second slot.

12. The one or more non-transitory, computer-readable media of claim 9, wherein the first PDCCH candidate in the first search space set is earlier than the first PDCCH candidate in the second search space set in time domain, and the instructions, when executed, further cause the processing circuitry to:

obtain a physical downlink shared channel (PDSCH) from the network device no earlier than the first PDCCH candidate in the second search space set in time domain, wherein the PDSCH has a mapping type B.

13. The one or more non-transitory, computer-readable media of claim 1, wherein the instructions, when executed, further cause the processing circuitry to: record the number of blind decoding.

14. The one or more non-transitory, computer-readable media of claim 1, wherein the UE does not support joint blind decoding and the number of blind decoding is two, or the UE does support joint blind decoding and the number of blind decoding is three.

15. A method comprising:

generating control information for transmission to a user equipment (UE), wherein the control information is to configure a plurality of search space sets and indicate a linkage between a first search space set of the plurality of search space sets and a second search space set of the plurality of search space sets, wherein a first physical downlink control channel (PDCCH) candidate in the first search space set is linked with a first PDCCH candidate in the second search space set and every PDCCH candidate in the first search space set is linked with a corresponding PDCCH candidate in the second search space set;

determining the first PDCCH candidate in the first search space set is dropped, wherein the UE is to monitor the first PDCCH candidate in the second search space set without monitoring the first PDCCH candidate in the first search space set;

counting a number of blind decoding for both the first PDCCH candidate in the first search space set and the first PDCCH candidate in the second search space set as two or three;

determining the number of blind decoding does not exceed a UE capability of monitoring PDCCH candidates;

generating a ranking of the plurality of search space sets based on whether individual search space sets are linked search space sets or non-linked search space sets, wherein all linked search space sets are ranked either higher or lower than all non-linked search space sets; and dropping one or more search space sets based on the ranking of the plurality of search space sets.

16. The method of claim 15, wherein the first search space set comprises a first plurality of PDCCH candidates and the second search space set comprises a second plurality of PDCCH candidates, and each PDCCH candidate of the first plurality of PDCCH candidates is linked to no more than one PDCCH candidate in the second plurality of PDCCH candidates.

17. The method of claim 15, wherein the first search space set is only linked to the second search space set.

18. The method of claim 15, wherein the first search space set comprises in time domain a first plurality of search spaces that are periodically repeated in a first period and the second search space set comprises in time domain a second plurality of search spaces that are periodically repeated in a second period, and wherein the first period is equal to the second period.

19. The method of claim 15, wherein the PDCCH is to schedule a physical downlink shared channel (PDSCH) with mapping type A and the first PDCCH candidate in the first search space set is restricted to be within a first three symbols of a first slot, and the first PDCCH candidate in the second search space set is restricted to be within a first three symbols of a second slot.

20. The method of claim 15, wherein the PDCCH is to schedule a physical downlink shared channel (PDSCH) with mapping type B and the first PDCCH candidate in the first search space set is earlier than the first PDCCH candidate in the second search space set in time domain, and the method further comprises:

transmitting the PDSCH no earlier than the first PDCCH candidate in the second search space set in time domain.

21. The method of claim 15, wherein the UE does not support joint blind decoding and the number of blind decoding is two, or the UE does support joint blind decoding and the number of blind decoding is three.

* * * * *